US009772404B2

(12) United States Patent
Shirasaka

(10) Patent No.: US 9,772,404 B2
(45) Date of Patent: Sep. 26, 2017

(54) OPTICAL SENSOR AND ELECTRONIC DEVICE

(71) Applicant: SHARP KABUSHIKI KAISHA, Osaka-shi, Osaka (JP)

(72) Inventor: Yasuyuki Shirasaka, Osaka (JP)

(73) Assignee: SHARP Kabushiki Kaisha, Osaka (JP)

( * ) Notice: Subject to any disclaimer, the term of this patent is extended or adjusted under 35 U.S.C. 154(b) by 53 days.

(21) Appl. No.: 14/655,433

(22) PCT Filed: Nov. 22, 2013

(86) PCT No.: PCT/JP2013/081523

§ 371 (c)(1),
(2) Date: Jun. 25, 2015

(87) PCT Pub. No.: WO2014/119103

PCT Pub. Date: Aug. 7, 2014

(65) Prior Publication Data

US 2015/0323670 A1 Nov. 12, 2015

(30) Foreign Application Priority Data

Jan. 31, 2013 (JP) ................................ 2013-016707

(51) Int. Cl.
*G01B 11/14* (2006.01)
*G01S 17/50* (2006.01)
(Continued)

(52) U.S. Cl.
CPC ............ *G01S 17/50* (2013.01); *G01J 1/0209* (2013.01); *G01J 1/0214* (2013.01);
(Continued)

(58) Field of Classification Search
CPC ..... G01B 11/026; G01B 11/002; G01B 11/14; G01S 5/163; G01S 5/16
(Continued)

(56) References Cited

U.S. PATENT DOCUMENTS

2012/0280107 A1* 11/2012 Skurnik ................ G06F 3/0416 250/206.1
2012/0280904 A1 11/2012 Skurnik et al.
2014/0012103 A1* 1/2014 Nishida ............. A61B 5/14532 600/316

FOREIGN PATENT DOCUMENTS

JP 02293606 * 4/1990 ............ G01B 11/00
JP 2000-075046 A 3/2000

(Continued)

*Primary Examiner* — Tarifur Chowdhury
*Assistant Examiner* — Md M Rahman
(74) *Attorney, Agent, or Firm* — Birch, Stewart, Kolasch & Birch, LLP

(57) ABSTRACT

In order to provide an optical sensor that can accurately sense a direction of movement of an object to be sensed even in a case where disturbance light is present, an optical sensor of the present invention includes: a light-emitting element; a circularly-segmented light-receiving element group (RDPD), including light-receiving elements circularly provided at edges of a region on which reflected light from an object to be sensed reflecting light emitted by the light-emitting element is incident, for generating respective photocurrents upon receiving the reflected light; and a gesture circuit section for sensing a direction of movement of the object to be sensed upon receiving the photocurrents generated by the light-receiving elements included in the circularly-segmented light-receiving element group (RDPD).

24 Claims, 20 Drawing Sheets

(51) Int. Cl.

| | |
|---|---|
| ***G01S 7/481*** | (2006.01) |
| ***G01P 13/00*** | (2006.01) |
| ***G01J 1/02*** | (2006.01) |
| ***G01J 1/04*** | (2006.01) |
| ***G01J 1/06*** | (2006.01) |
| ***G01J 1/16*** | (2006.01) |

(52) U.S. Cl.
CPC ............... *G01J 1/0411* (2013.01); *G01J 1/06* (2013.01); *G01J 1/1626* (2013.01); *G01P 13/00* (2013.01); *G01S 7/481* (2013.01); *G01S 7/4813* (2013.01)

(58) Field of Classification Search
USPC .......................................................... 356/614
See application file for complete search history.

(56) References Cited

FOREIGN PATENT DOCUMENTS

| | | | |
|---|---|---|---|
| JP | 3240941 | B2 | 12/2001 |
| JP | 2008-008849 | A | 1/2008 |

* cited by examiner

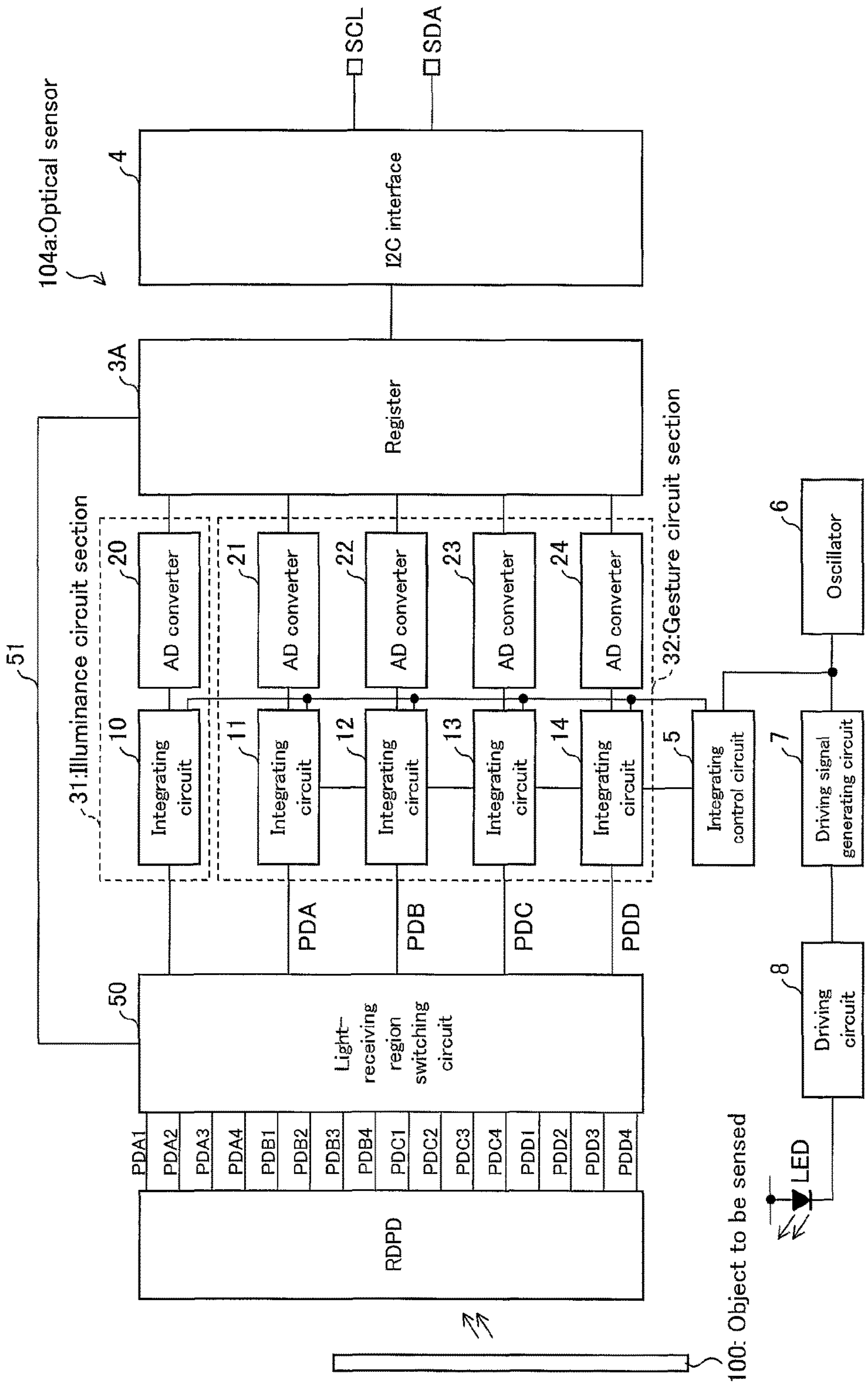
FIG. 14
104a:Optical sensor
SCL
SDA
4
I2C interface
3A
Register
51
31:Illuminance circuit section
32:Gesture circuit section
20
21
22
23
24
AD converter
AD converter
AD converter
AD converter
AD converter
10
11
12
13
14
Integrating circuit
Integrating circuit
Integrating circuit
Integrating circuit
Integrating circuit
5
Integrating control circuit
6
Oscillator
7
Driving signal generating circuit
8
Driving circuit
PDA
PDB
PDC
PDD
50
Light-receiving region switching circuit
PDA1
PDA2
PDA3
PDA4
PDB1
PDB2
PDB3
PDB4
PDC1
PDC2
PDC3
PDC4
PDD1
PDD2
PDD3
PDD4
RDPD
LED
100: Object to be sensed 301: Light-emitting element
302,303: Light-receiving element
304: Object to be sensed

OPTICAL SENSOR AND ELECTRONIC DEVICE

TECHNICAL FIELD

The present invention relates to, for example, (i) an optical sensor that is suitably used as a proximity sensor or a gesture sensor and (ii) an electronic device using such an optical sensor.

BACKGROUND ART

There is a growing demand for mounting of a liquid crystal panel for use in an electronic device such as a mobile phone or a digital camera with an optical sensor that has a sensing function of, in order to reduce power consumption and prevent a malfunction of a touch panel, controlling a display of the liquid crystal panel or invalidating a function of the touch panel by sensing a situation in which a user does not operate the electronic device, e.g., a case where a face comes close to the liquid crystal panel. Note here that a sensing function with respect to an object to be sensed of an optical sensor depends on an intensity of reflected light that is reflected from the object to be sensed and is incident on the optical sensor. This causes an output of the optical sensor to be inversely proportional to a distance between the object to be sensed and the optical sensor. There is also a demand for use of an optical sensor as a range sensor by use of such a characteristic as described above. Further, there has recently been a demand for use of an optical sensor as a gesture sensor by disposition of a plurality of photodiodes in the optical sensor to sense a movement of, for example, a hand from amounts of change in photocurrents that the photodiodes output in response to reflected light from objects to be sensed.

Note here that a liquid crystal panel for use in an electronic device such as a mobile phone or a digital camera mounted with such an optical sensor as described above is often used under illumination by an illuminating device provided outdoors or indoors. For this reason, even in a case where disturbance light is incident on the optical sensor, the liquid crystal panel is required to properly activate the optical sensor.

Such an optical sensor is exemplified by, for example, a light source direction sensor disclosed in Patent Literature 1. The light source direction sensor disclosed in Patent Literature 1 includes: a plurality of light-receiving elements; and a lens that collects optical signals from a light source into the light-receiving elements, the light source direction sensor causing an arithmetic processing section to carry out arithmetic processing with respect to a first optical signal detection value outputted by a first light-receiving element and a second optical signal detection value outputted by a second light-receiving element, and the light source direction sensor outputting a sensor output in accordance with values found by the arithmetic processing.

Next, there is a demand for disposition of a plurality of photodiodes in a light-receiving section of an optical sensor to sense a movement of an object from amounts of change in photocurrents that the photodiodes output in response to reflected light from objects to be sensed.

Such an optical sensor that senses a movement of an object is exemplified by, for example, a reflective sensor disclosed in Patent Literature 2. The reflective sensor disclosed in Patent Literature 2 includes: at least one light-emitting element; and a plurality of light-receiving elements for sensing light emitted by the at least one light-emitting element and reflected from an object to be sensed, the plurality of light-receiving elements being disposed at a distance from each other and collectively packaged with the at least one light-emitting element by a packaging member.

This reflective optical sensor, as shown in FIG. 20, includes a light-emitting element 301 and two light-receiving elements 302 and 303, with the light-receiving elements 302 and 303 disposed on both sides of the light-emitting element 301 respectively. In a case where an object to be sensed 304 is on the right side, light reflected from the object to be sensed 304 strongly strikes the light-receiving element 303. On the other hand, in a case where the object to be sensed 304 is on the left side, light reflected from the object to be sensed 304 strongly strikes the light-receiving element 302. Moreover, the position and/or movement of the object to be sensed 304 can be detected by reading a difference between a photocurrent generated in the light-receiving element 302 and a photocurrent generated in the light-receiving element 303.

Further, as a sensor that senses a movement of an object, there is also a demand for use of an optical sensor as a gesture sensor that senses a movement of, for example, a hand. Such a gesture sensor is used as an added function of a proximity sensor, and senses a movement of, for example, a hand over the touch panel in a noncontact manner. This makes it possible to operate a screen displayed on a liquid crystal panel, without contaminating a surface of the liquid crystal panel even with, for example, a wet hand or a dirty hand.

A conventional technique for allowing a sensor including a light-emitting element and a segmented photodiode to sense a direction of movement of an object to be sensed is exemplified by, for example, a technique disclosed in Patent Literature 3. Patent Literature 3 discloses a configuration in which multilayer metal is stacked on a light-emitting element and a four segmented photodiode (light-receiving elements). These light-receiving elements each have directivity (sensitivity) in a corresponding one of an upward direction, a downward direction, a rightward direction, and a leftward direction. According to Patent Literature 3, a direction of movement of an object to be sensed is sensed by obtaining (i) a difference between a signal from the light-receiving element having directivity in the upward direction and a signal from the light-receiving element having directivity in the downward direction and (i) a difference between a signal from the light-receiving element having directivity in the leftward direction and a signal from the light-receiving element having directivity in the rightward direction.

Such an electronic device mounted with an optical sensor is used outdoors or indoors. For this reason, even in a case where disturbance light attributed to natural light or illuminating light is incident on the optical sensor, the electronic device is required to properly activate the optical sensor. In particular, a gesture sensor that detects a movement of an object to be sensed is supposed to be used under intense disturbance light such as natural light or illuminating light. This further requires the gesture sensor to be properly activated in a case where disturbance light attributed to natural light or illuminating light is incident on the optical sensor.

CITATION LIST

Patent Literatures

Patent Literature 1

Japanese Patent Application Publication, Tokukai, No. 2008-8849 A (Publication Date: Jan. 17, 2008)

Patent Literature 2

Japanese Patent Application Publication, Tokukai, No. 2000-75046 A (Publication Date: Mar. 14, 2000)

Patent Literature 3

Specification of U.S. Patent No. 2012/0280904 (Publication Date: Nov. 8, 2012)

SUMMARY OF INVENTION

Technical Problem

However, such conventional techniques as described above each insufficiently consider sensing of a direction of movement of an object to be sensed in a case where disturbance light is present.

The present invention has been made in view of the problems described above, and it is an object of the present invention to provide an optical sensor that can accurately sense a movement of an object to be sensed even in a case where disturbance light is present.

Solution to Problem

In order to attain the object, an optical sensor of an aspect of the present invention includes: a light-emitting element; a plurality of first light-receiving elements, circularly provided at edges of a region on which reflected light from an object to be sensed reflecting light emitted by the light-emitting element is incident, for generating respective photocurrents upon receiving the reflected light; and a movement direction sensing section for sensing a direction of movement of the object to be sensed upon receiving the photocurrents generated by the plurality of first light-receiving elements.

Advantageous Effects of Invention

According to the aspect of the present invention, the movement of the object to be sensed changes the region on which the reflected light from the object to be sensed reflecting light emitted by the light-emitting element is incident. The change starts in a case where the reflected light starts being incident at an edge of the region, and the change ends in a case where the reflected light finishes being incident at another edge of the region. That is, the reflected light that is incident on a part of the region which part is different from the edges does not reflect entry/departure by movement of the object to be sensed into/from a range of sensing by the optical sensor. Then, in a case where the plurality of first light-receiving elements are circularly provided at the edges of the region, the plurality of first light-receiving elements can receive the reflected light that accurately reflects entry/departure by movement of the object to be sensed into/from the range of sensing by the optical sensor.

The optical sensor can thus sense the direction of movement of the object to be sensed. Note that, upon receiving the photocurrents generated by the plurality of first light-receiving elements, the movement direction sensing section can sense the direction of movement of the object to be sensed by comparing (a) a position of a first light-receiving element on which the reflected light is incident during entry by movement of the object to be sensed into the range of sensing by the optical sensor and (b) a position of another first light-receiving element on which the reflected light is incident during departure by movement of the object to be sensed from the range of sensing by the optical sensor.

Further, in a case where no first light-receiving element is provided in a region on which the reflected light that does not reflect entry/departure by movement of the object to be sensed into/from the range of sensing by the optical sensor is incident, it is possible in sensing of the direction of movement of the object to be sensed to prevent an adverse effect caused by light (disturbance light) that is different from the reflected light from the object to be sensed reflecting light emitted by the light-emitting element and is incident from an outside of the optical sensor.

Namely, the present invention yields an effect of accurately sensing the direction of movement of the object to be sensed even in a case where disturbance light is present.

BRIEF DESCRIPTION OF DRAWINGS

FIG. 14 is a block diagram showing a configuration of the optical sensor in accordance with the third embodiment of the present invention.

DESCRIPTION OF EMBODIMENTS

The following description specifically discusses embodiments of the present invention.

Embodiment 1

A first embodiment of the present invention is described below with reference to FIGS. 1 through 8.

<Configuration of Optical Sensor 101>

Figure 2:
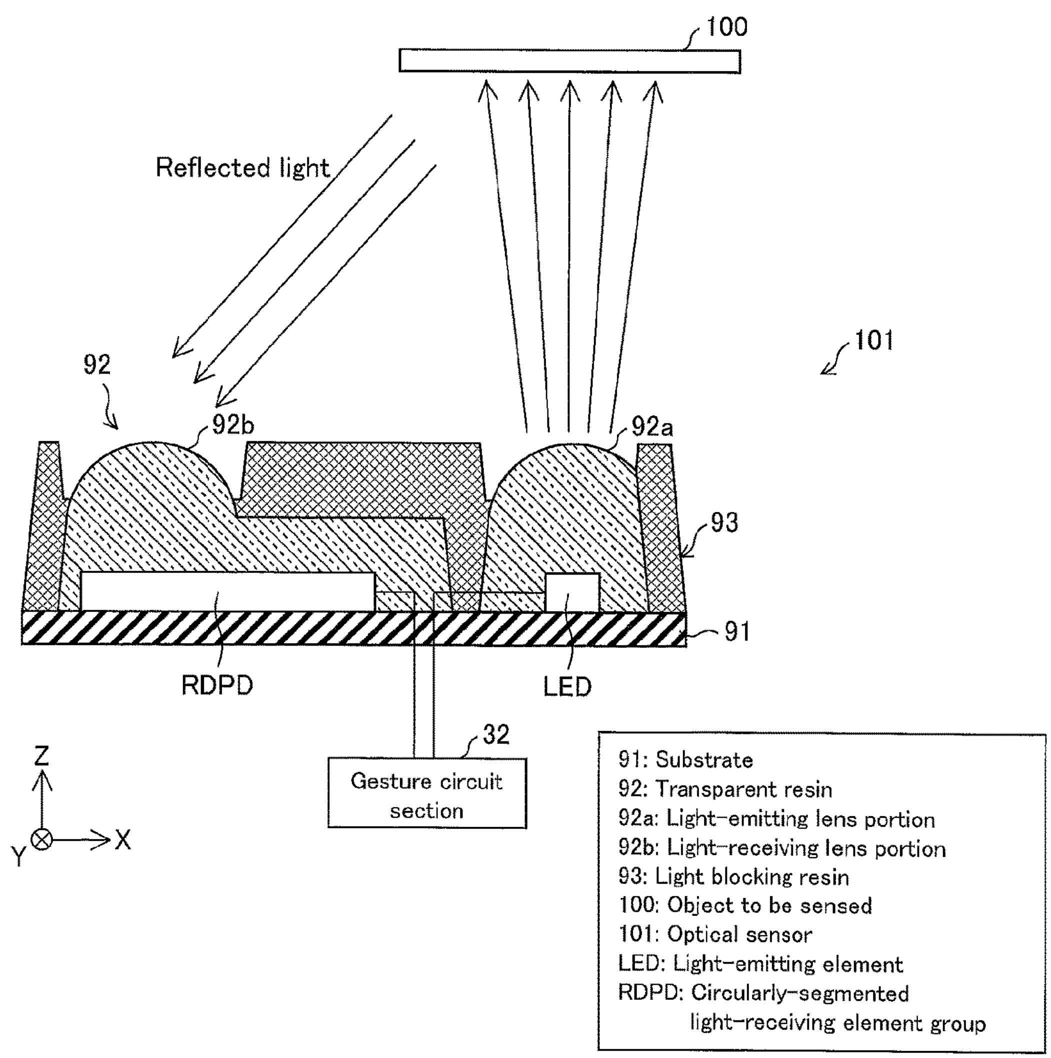
FIG. 2 is a longitudinal sectional view showing a cross-section configuration of an optical sensor including the circularly-segmented light-receiving element group shown in FIG. 1.

FIG. 2 is a longitudinal sectional view showing a cross-section configuration of an optical sensor 101 in accordance with the first embodiment of the present invention. As shown in FIG. 2, the optical sensor 101 includes a light-emitting element LED, a circularly-segmented light-receiving element group RDPD (a plurality of first light-receiving elements), a substrate 91, a transparent resin section 92, a light blocking resin section 93, and a gesture circuit section (movement direction sensing section) 32. Note that directions of coordinate axes indicated by X, Y, and Z correspond to those of coordinate axes shown in other drawings.

Note here that the circularly-segmented light-receiving element group RDPD, which is circularly provided (described later) at edges of a region on which reflected light from an object to be sensed 100 reflecting light emitted by the light-emitting element LED is incident, generates a photocurrent upon receiving the reflected light. The gesture circuit section 32 which receives the photocurrent generated by the circularly-segmented light-receiving element group RDPD detects a direction of movement of the object to be sensed 100. Note that the object to be sensed 100 may be, for example, a finger or a pen with which to operate a smartphone including the optical sensor 101.

The following description specifically discusses main members of the optical sensor 101.

(Light-Emitting Element LED)

The light-emitting element LED and the circularly-segmented light-receiving element group RDPD are mounted at a distance from each other on the substrate 91. The light-emitting element LED is constituted by a light-emitting diode (LED). Note, however, that the configuration of the light-emitting element LED is not limited to this. A light source different from a light-emitting diode may be used as the light-emitting element LED.

In a case where the object to be sensed 100 comes close to the optical sensor 101, light emitted by the light-emitting element LED is reflected by the object to be sensed 100, and the reflected light is incident on the circularly-segmented light-receiving element group RDPD. The light-emitting element LED outputs an infrared optical pulse and causes the circularly-segmented light-receiving element group RDPD to detect only a signal in synchronization with the infrared optical pulse.

Note here that light emitted by the light-emitting element LED is not reflected from the object to be sensed 100 in a case where the object to be sensed 100 is absent. Thus, only disturbance light is incident on the circularly-segmented light-receiving element group RDPD. Meanwhile, in a case where the object to be sensed 100 comes close to the optical sensor 101, light emitted by the light-emitting element LED is reflected by the object to be sensed 100, and reflected light (signal light) and disturbance light are incident on the circularly-segmented light-receiving element group RDPD. Note here that, as the object to be sensed 100 is closer to the optical sensor 101, the reflected light (signal light) is incident on the circularly-segmented light-receiving element group RDPD in a larger amount. Thus, in a case where the optical sensor 101 is desired to be used as a proximity sensor, it is possible to determine, when the amount of the reflected light (signal light) exceeds a given threshold value, that the object to be sensed 100 is in close proximity to the optical sensor 101.

That is, in a case where light emitted by the light-emitting element LED is reflected by the object to be sensed 100 and is incident on the circularly-segmented light-receiving element group RDPD, a signal obtained by a photocurrent generated by the circularly-segmented light-receiving element group RDPD can be used not only for sensing of movement of the object to be sensed 100 but also as a proximity signal of the object to be sensed 100. This allows the optical sensor 101 to be used not only as a movement direction (gesture) sensing sensor of the object to be sensed 100 but also as a proximity sensor. For example, a sum of photocurrents (signal outputs) obtained from light-receiving elements included in the circularly-segmented light-receiving element group RDPD may be used as a proximity signal of the object to be sensed 100.

(Circularly-Segmented Light-Receiving Element Group RDPD)

The circularly-segmented light-receiving element group RDPD is constituted by a photodiode or a phototransistor or by an OPIC (Optical IC) (registered trademark), which is made by integrating the circularly-segmented light-receiving element group RDPD with a signal processing circuit or an LED driver circuit.

Figure 1:
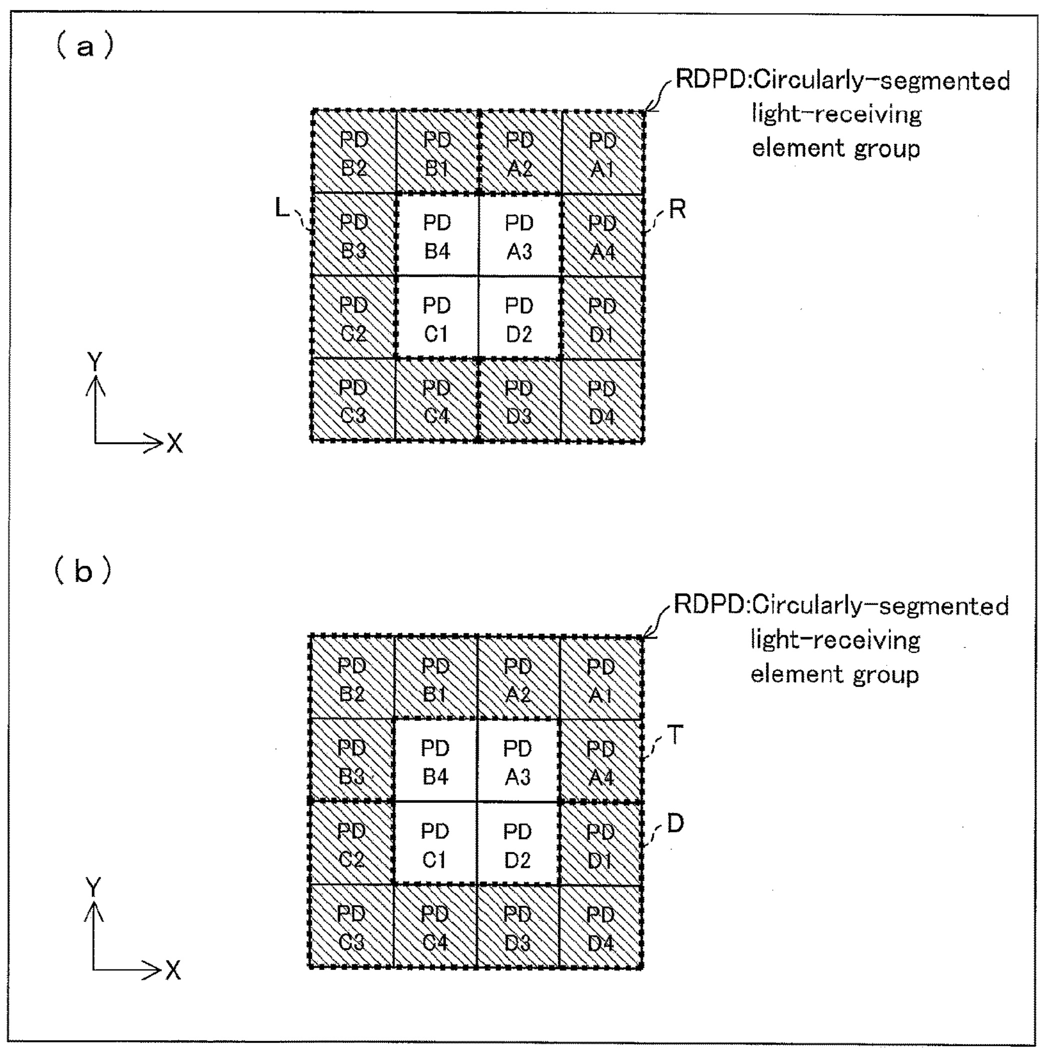
FIG. 1 is a plan view showing a planar configuration of a circularly-segmented light-receiving element group of an optical sensor in accordance with a first embodiment of the present invention. (a) of FIG. 1 shows a configuration in a case where the optical sensor senses a transverse movement of an object to be sensed. (b) of FIG. 1 shows a configuration in a case where the optical sensor senses a vertical movement of the object to be sensed.

FIG. 1 is a plan view showing a planar configuration of the circularly-segmented light-receiving element group RDPD of the optical sensor 101 shown in FIG. 2. (a) of FIG.

1 shows a configuration in a case where the optical sensor 101 senses a transverse movement of the object to be sensed 100. (b) of FIG. 1 shows a configuration in a case where the optical sensor 101 senses a vertical movement of the object to be sensed 100. Note here that a transverse direction indicates a negative or positive x-axis direction shown in (a) of FIG. 1. Note also that a vertical direction indicates a positive or negative y-axis direction shown in (b) of FIG. 1.

As shown in (a) of FIG. 1, a region of the substrate 91 on which region reflected light from the object to be sensed 100 reflecting light emitted by the light-emitting element LED is incident is two-dimensionally segmented into 16 regions. The segmented regions are provided with respective light-receiving elements (PDA1 to PDA4, PDB1 to PDB4, PDC1 to PDC4, and PDD1 to PDD4). Of these light-receiving elements, the circularly-segmented light-receiving element group RDPD is made up of the light-receiving elements (PDA1, PDA2, PDA4, PDB1 to PDB3, PDC2 to PDC4, PDD1, PDD3, and PDD4), which are located at edges of the region which are hatched. That is, the circularly-segmented light-receiving element group RDPD is made up of the light-receiving elements different from four light-receiving elements (PDA3, PDB4, PDC1, and PDD2), which are located at a central part of the region on which the reflected light from the object to be sensed 100 reflecting light emitted by the light-emitting element LED is incident.

The circularly-segmented light-receiving element group RDPD is divided, in (a) of FIG. 1, into an L group indicated by a letter "L" (PDB1 to PDB3, and PDC2 to PDC4) and an R group indicated by a letter "R" (PDA1, PDA2, PDA4, PDD1, PDD3, and PDD4) so that the optical sensor 101 senses the transverse movement of the object to be sensed 100. This causes the optical sensor 101 to sense the transverse movement of the object to be sensed 100 by use of photocurrents generated by the light-receiving elements included in the L group and photocurrents generated by the light-receiving elements included in the R group.

Meanwhile, the circularly-segmented light-receiving element group RDPD is divided, in (b) of FIG. 1, into a T group indicated by a letter "T" (PDA1, PDA2, PDA4, and PDB1 to PDB3) and a D group indicated by a letter "D" (PDC2 to PDC4, PDD1, PDD3, and PDD4) so that the optical sensor 101 senses the vertical movement of the object to be sensed 100. This causes the optical sensor 101 to sense the vertical movement of the object to be sensed 100 by use of photocurrents generated by the light-receiving elements included in the T group and photocurrents generated by the light-receiving elements included in the D group.

That is, a relative positional relationship between the object to be sensed 100 and the optical sensor 101 can be detected by detecting a difference in photocurrent among the light-receiving elements PDA1, PDA2, PDA4, PDB1 to PDB3, PDC2 to PDC4, PDD1, PDD3, and PDD4, which are circularly provided. Further, a speed of movement and the direction of movement of the object to be sensed 100 can also be detected by detecting a change over time in position of the object to be sensed 100.

(Transparent Resin Section 92 and Light Blocking Resin Section 93)

The transparent resin section 92 is formed on the substrate 91 in such a manner as to cover the light-emitting element LED and the light-receiving element group RDPD. The transparent resin section 92 is made of a transparent resin material or a visible light-cutting resin material that transmits a wavelength component of light emitted by the light-emitting element LED and cuts a visible light component. The transparent resin section 92 has a light-emitting lens portion **92*a* and a light-receiving lens portion 92*b* (lens-shaped protrusion) on a surface thereof (see FIG. 2). The light-emitting lens portion 92*a* is a convex lens having a hemispherical shape curved toward a side toward which the light-emitting element LED emits light. The light-emitting lens portion 92*a*** causes the light from the light-emitting element LED to be emitted in such a manner as to be focused onto a predetermined position or to be converted into parallel light.

The light-receiving lens portion **92*b* is a convex lens having a hemispherical shape curved toward a side from which the light-receiving element group RDPD receives the light. The light-receiving lens portion 92*b* causes the light reflected from the object to be sensed 100 to be focused onto the light-receiving element group RDPD. In other words, the light-receiving lens portion 92*b* has one of focal points which one is located in the region on which the reflected light from the object to be sensed 100 reflecting light emitted by the light-emitting element LED is incident, and collects the reflected light in the region. Note here that the "region on which the reflected light from the object to be sensed 100 reflecting light emitted by the light-emitting element LED is incident" refers to a region of the substrate 91** provided with the circularly-segmented light-receiving element group RDPD.

The configuration allows the light-receiving lens portion **92*b* to collect the reflected light from the object to be sensed 100. Thus, the optical sensor 101 can more accurately sense the direction of movement of the object to be sensed 100** even in a case where disturbance light is present.

Note that the optical sensor 101 is not limited in configuration to the above configuration. The optical sensor 101 may be provided with no light-emitting lens portion **92*a*. However, in a case where the light-emitting element LED causes the light-emitting lens portion 92*a* to collect light, it is possible to improve sensing sensitivity with which to sense the direction of movement of the object to be sensed 100, the sensing sensitivity depending on a distance between the optical sensor 101 and the object to be sensed 100. That is, as compared with a case where the optical sensor 101 is provided with no light-emitting lens portion 92*a*, according to the above configuration, the optical sensor 101 and the object to be sensed 100 have a longer distance therebetween, and the optical sensor 101 which is provided with the light-emitting lens portion 92*a* can more accurately sense the direction of movement of the object to be sensed 100 even in a case where disturbance light is present. Further, the optical sensor 101 which is provided with the light-emitting lens portion 92*a* can change a range in which the optical sensor 101 can carry out the sensing (range extending in a direction parallel to an X-Y plane of FIG. 1**).

The light blocking resin section 93 is molded with a light-blocking resin so as to cover an outside of the transparent resin section 92.

<Operation of Optical Sensor 101>

Figure 3:
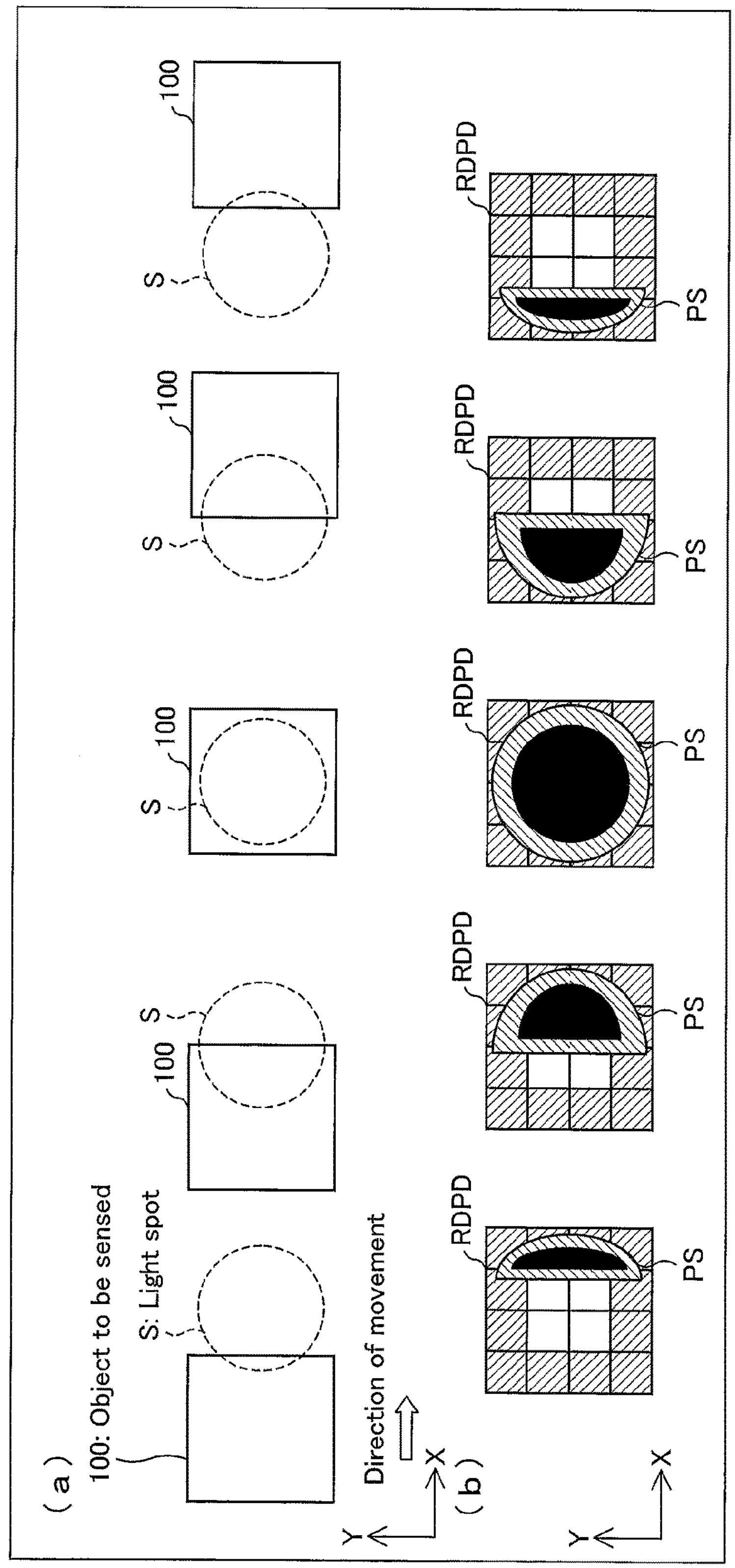
FIG. 3 schematically shows an operation of the optical sensor shown in FIG. 2. (a) of FIG. 3 shows how an object to be sensed moves in one direction. (b) of FIG. 3 shows, in association with (a) of FIG. 3, how an image projected on a circularly-segmented light-receiving element group changes.

FIG. 3 schematically shows an operation of the optical sensor 101 shown in FIG. 2. (a) of FIG. 3 shows how the object to be sensed 100 moves in one direction. (b) of FIG. 3 shows, in association with (a) of FIG. 3, how an image PS projected on the circularly-segmented light-receiving element group RDPD changes. Note here that the image PS projected on the circularly-segmented light-receiving element group RDPD refers to the region on which the reflected light from the object to be sensed 100 reflecting light emitted by the light-emitting element LED is incident.

As shown in (a) of FIG. 3, the object to be sensed 100 moves in one direction so as to traverse a light spot S formed by light emitted by the light-emitting element LED. In accordance with the movement, a part of the light spot S which part is reflected by the object to be sensed 100 changes. Then, in accordance with the change, the image PS projected on the circularly-segmented light-receiving element group RDPD changes as shown in (b) of FIG. 3.

Note here that the optical sensor 101 senses the movement of the object to be sensed 100 by measuring a photocurrent generated in a case where light contained in the part of the light spot S which part is reflected by the object to be sensed 100 is incident on the circularly-segmented light-receiving element group RDPD. That is, since the optical sensor 101 senses the movement of the object to be sensed 100 by use of the light contained in the light spot S, the light spot S can be said to be a range of sensing by the optical sensor 101.

Specifically, during entry by movement of the object to be sensed 100 into the range of sensing by the optical sensor 101 (a situation in the leftmost drawing of (a) of FIG. 3), only a left edge of the light spot S is reflected and reversed by the light-receiving lens portion 92*b*, so that the image PS starts to be projected on a right edge of the circularly-segmented light-receiving element group RDPD (see the leftmost drawing of (b) of FIG. 3). Then, the image PS projected on the circularly-segmented light-receiving element group RDPD extends in accordance with the movement of the object to be sensed 100, so that the image PS projected on the circularly-segmented light-receiving element group RDPD has the maximum size (see the central drawing of (b) of FIG. 3). Thereafter, the image PS projected on the circularly-segmented light-receiving element group RDPD is made smaller, so that during departure by movement of the object to be sensed 100 from the range of sensing by the optical sensor 101 (a situation in the rightmost drawing of (a) of FIG. 3), the image PS is projected on a left edge of the circularly-segmented light-receiving element group RDPD and made smaller (see the rightmost drawing of (b) of FIG. 3).

That is, the movement of the object to be sensed 100 changes the region on which the reflected light from the object to be sensed 100 reflecting light emitted by the light-emitting element LED is incident. The change starts in a case where the reflected light starts being incident at an edge of the region, and the change ends in a case where the reflected light finishes being incident at another edge of the region. That is, the reflected light that is incident on a part of the region which part is different from the edges does not reflect entry/departure by movement of the object to be sensed 100 into/from the range of sensing by the optical sensor 101. Then, in a case where the light-receiving elements included in the circularly-segmented light-receiving element group RDPD are circularly provided at the edges of the region, the light-receiving elements can receive the reflected light that accurately reflects entry/departure by movement of the object to be sensed 100 into/from the range of sensing by the optical sensor 101. Thus, upon receiving the photocurrents generated by the light-receiving elements included in the circularly-segmented light-receiving element group RDPD, the gesture circuit section 32 can sense the direction of movement of the object to be sensed 100 by comparing (a) a position of a light-receiving element on which the reflected light is incident during entry by movement of the object to be sensed 100 into the range of sensing by the optical sensor 101 and (b) a position of another light-receiving element on which the reflected light is incident during departure by movement of the object to be sensed 100 from the range of sensing by the optical sensor 101. The optical sensor 101 can thus sense the direction of movement of the object to be sensed 100.

Further, in a case where no light-receiving element that is included in the circularly-segmented light-receiving element group RDPD is provided in a region on which the reflected light that does not reflect entry/departure by movement of the object to be sensed 100 into/from the range of sensing by the optical sensor 101 is incident, it is possible in sensing of the direction of movement of the object to be sensed 100 to prevent an adverse effect caused by light (disturbance light) that is different from the reflected light from the object to be sensed 100 reflecting light emitted by the light-emitting element LED and is incident from an outside of the optical sensor 101.

<Effect of Optical Sensor 101>

According to Embodiment 1, the optical sensor 101 can accurately sense the direction of movement of the object to be sensed 100 even in a case where disturbance light is present.

Further, the optical sensor 101, which allows the light-receiving lens portion 92*b* to collect the reflected light from the object to be sensed 100, can more accurately sense the direction of movement of the object to be sensed even in a case where disturbance light is present.

Comparative Example 1

The following description discusses a configuration and an operation of a segmented light-receiving element group DPD in accordance with a comparative example of the circularly-segmented light-receiving element group RDPD.

Figure 4:
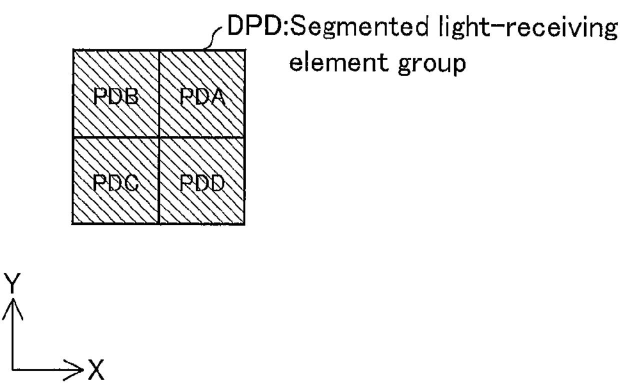
FIG. 4 is a plan view showing a planar configuration of a segmented light-receiving element group in accordance with a comparative example of the circularly-segmented light-receiving element group shown in FIG. 1.

FIG. 4 is a plan view showing a planar configuration of the segmented light-receiving element group DPD in accordance with the comparative example of the circularly-segmented light-receiving element group RDPD shown in FIG. 1. Coordinate axes indicated by X and Y in FIG. 4 correspond to the coordinate axes shown in FIG. 1. The following description discusses a comparative example in which the optical sensor 101 includes the segmented light-receiving element group DPD instead of the circularly-segmented light-receiving element group RDPD. As shown in FIG. 4, an optical sensor of the comparative example is configured such that a region of the substrate 91 on which region the reflected light from the object to be sensed 100 reflecting light emitted by the light-emitting element LED is incident is two-dimensionally segmented into four regions. The segmented regions are provided with respective light-receiving elements (PDA, PDB, PDC, and PDD). The optical sensor of the comparative example uses all these light-receiving elements to sense a direction of movement of the object to be sensed 100.

Figure 5:
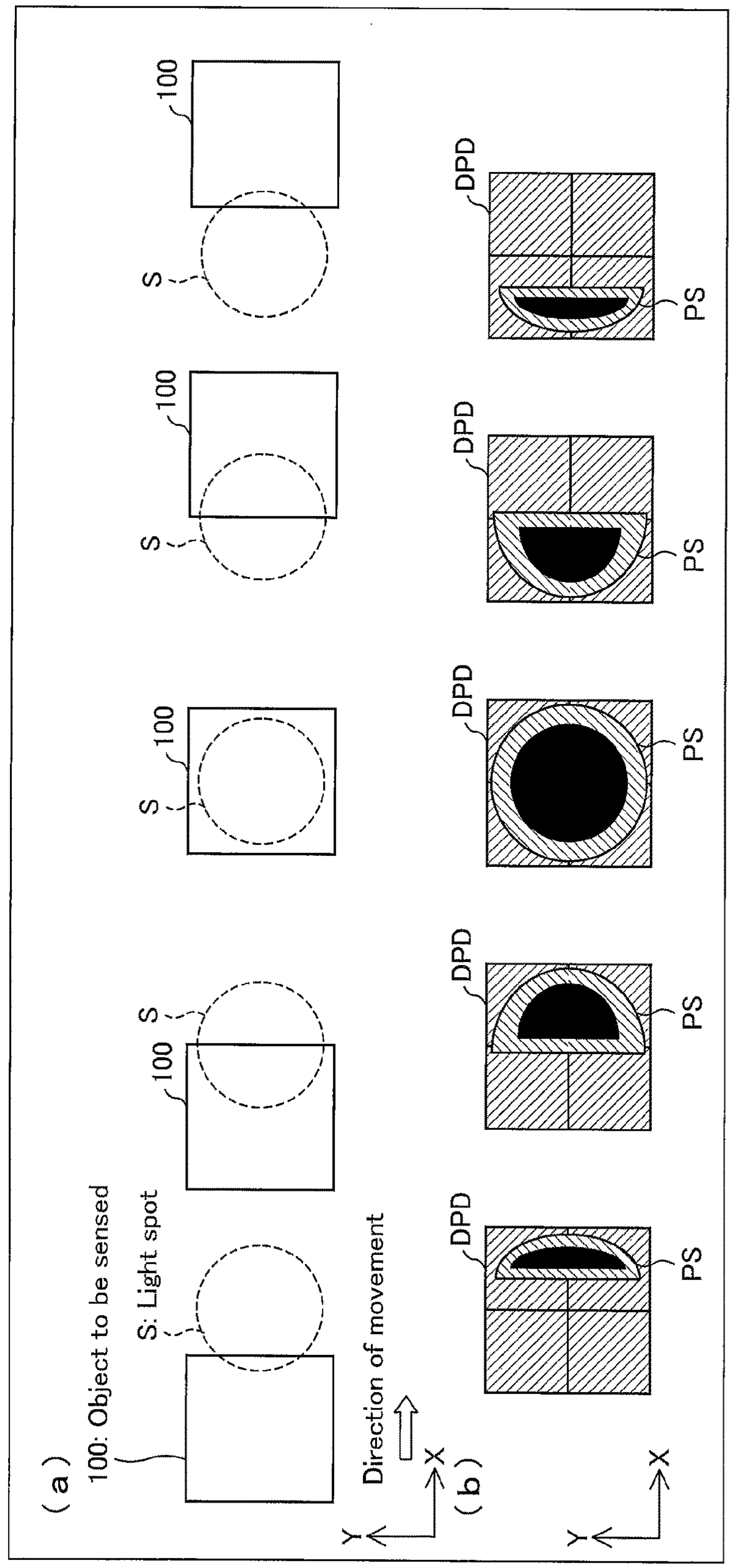
FIG. 5 schematically shows an operation of a comparative example of the optical sensor shown in FIG. 2. (a) of FIG. 5 shows how an object to be sensed moves in one direction. (b) of FIG. 5 shows, in association with (a) of FIG. 5, how an image projected on a segmented light-receiving element group changes.

FIG. 5 schematically shows an operation of the optical sensor in accordance with the comparative example of the optical sensor 101 shown in FIG. 2. (a) of FIG. 5 shows how the object to be sensed 100 moves in one direction. (b) of FIG. 5 shows, in association with (a) of FIG. 5, how an image PS projected on the segmented light-receiving element group DPD changes. Coordinate axes indicated by X and Y in FIG. 5 correspond to the coordinate axes shown in FIG. 3. Note here that the image PS projected on the segmented light-receiving element group DPD refers to a region on which the reflected light from the object to be sensed 100 reflecting light emitted by the light-emitting element LED is incident.

As in the case of the optical sensor 101, as shown in (a) of FIG. 5, the object to be sensed 100 moves in one direction so as to traverse a light spot S formed by light emitted by the light-emitting element LED. In accordance with the movement, a part of the light spot S which part is reflected by the object to be sensed 100 changes. Then, in accordance with the change, the image PS projected on the segmented light-receiving element group DPD changes as shown in (b) of FIG. 5.

Figure 6:
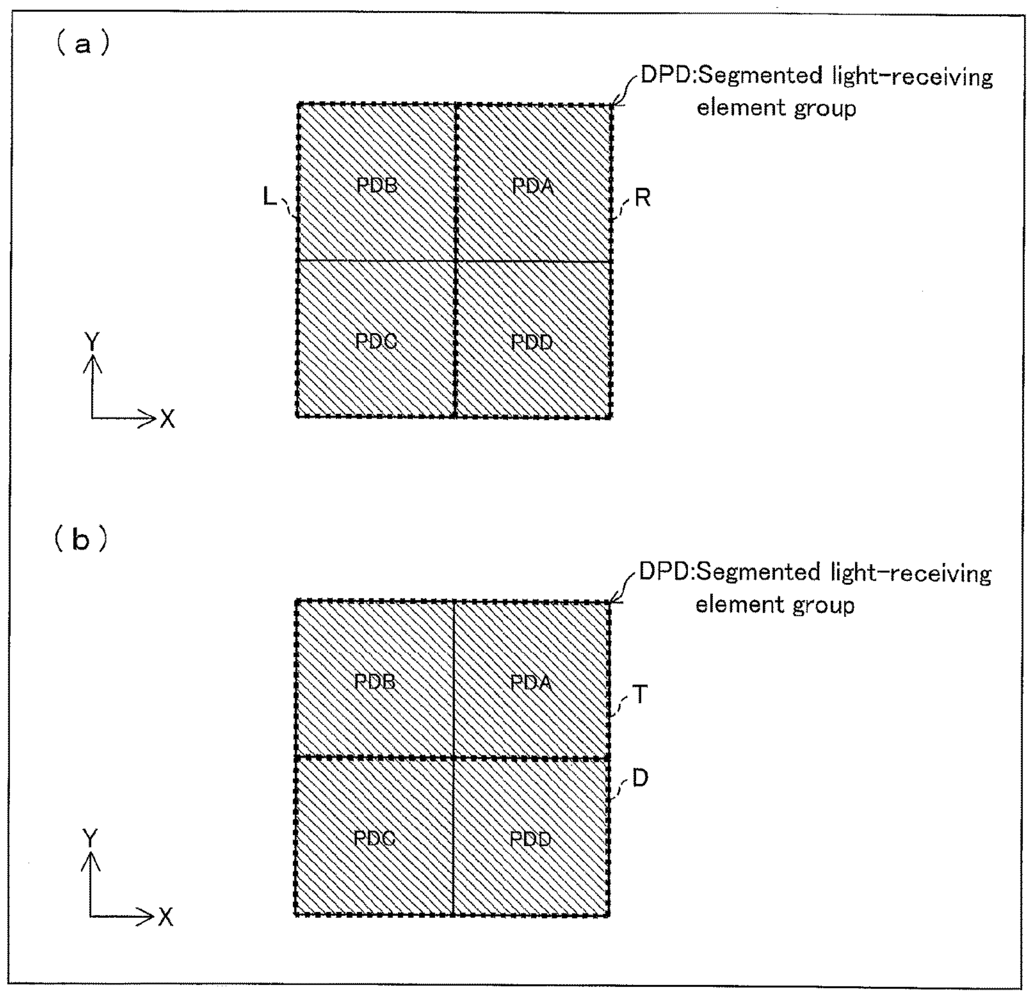
FIG. 6 schematically shows an operation of the segmented light-receiving element group in accordance with the comparative example shown in FIG. 4. (a) of FIG. 6 shows a configuration in a case where an optical sensor senses a transverse movement of an object to be sensed. (b) of FIG. 6 shows a configuration in a case where the optical sensor senses a vertical movement of the object to be sensed.

FIG. 6 schematically shows an operation of the segmented light-receiving element group DPD in accordance with the comparative example shown in FIG. 4. (a) of FIG. 6 shows a configuration in a case where the optical sensor senses a transverse movement of the object to be sensed 100. (b) of FIG. 6 shows a configuration in a case where the optical sensor senses a vertical movement of the object to be sensed 100. Coordinate axes indicated by X and Y in FIG. 6 correspond to the coordinate axes shown in FIG. 1. Note here that a transverse direction indicates a negative or positive x-axis direction shown in (a) of FIG. 6. Note also that a vertical direction indicates a positive or negative y-axis direction shown in (b) of FIG. 6.

The segmented light-receiving element group DPD is divided, in (a) of FIG. 6, into an L group indicated by a letter "L" (PDB and PDC) and an R group indicated by a letter "R" (PDA and PDD) so that the optical sensor senses the transverse movement of the object to be sensed 100. This causes the optical sensor to sense the transverse movement of the object to be sensed 100 by use of photocurrents generated by the light-receiving elements included in the L group and photocurrents generated by the light-receiving elements included in the R group.

Meanwhile, the segmented light-receiving element group DPD is divided, in (b) of FIG. 6, into a T group indicated by a letter "T" (PDA and PDB) and a D group indicated by a letter "D" (PDC and PDD) so that the optical sensor senses the vertical movement of the object to be sensed 100. This causes the optical sensor to sense the vertical movement of the object to be sensed 100 by use of photocurrents generated by the light-receiving elements included in the T group and photocurrents generated by the light-receiving elements included in the D group.

That is, a relative positional relationship between the object to be sensed 100 and the optical sensor including the segmented light-receiving element group DPD is detected by detecting a difference in photocurrent among the light-receiving elements PDA to PDD. Further, a speed of movement and the direction of movement of the object to be sensed 100 are detected by detecting a change over time in position of the object to be sensed 100.

Figure 7:
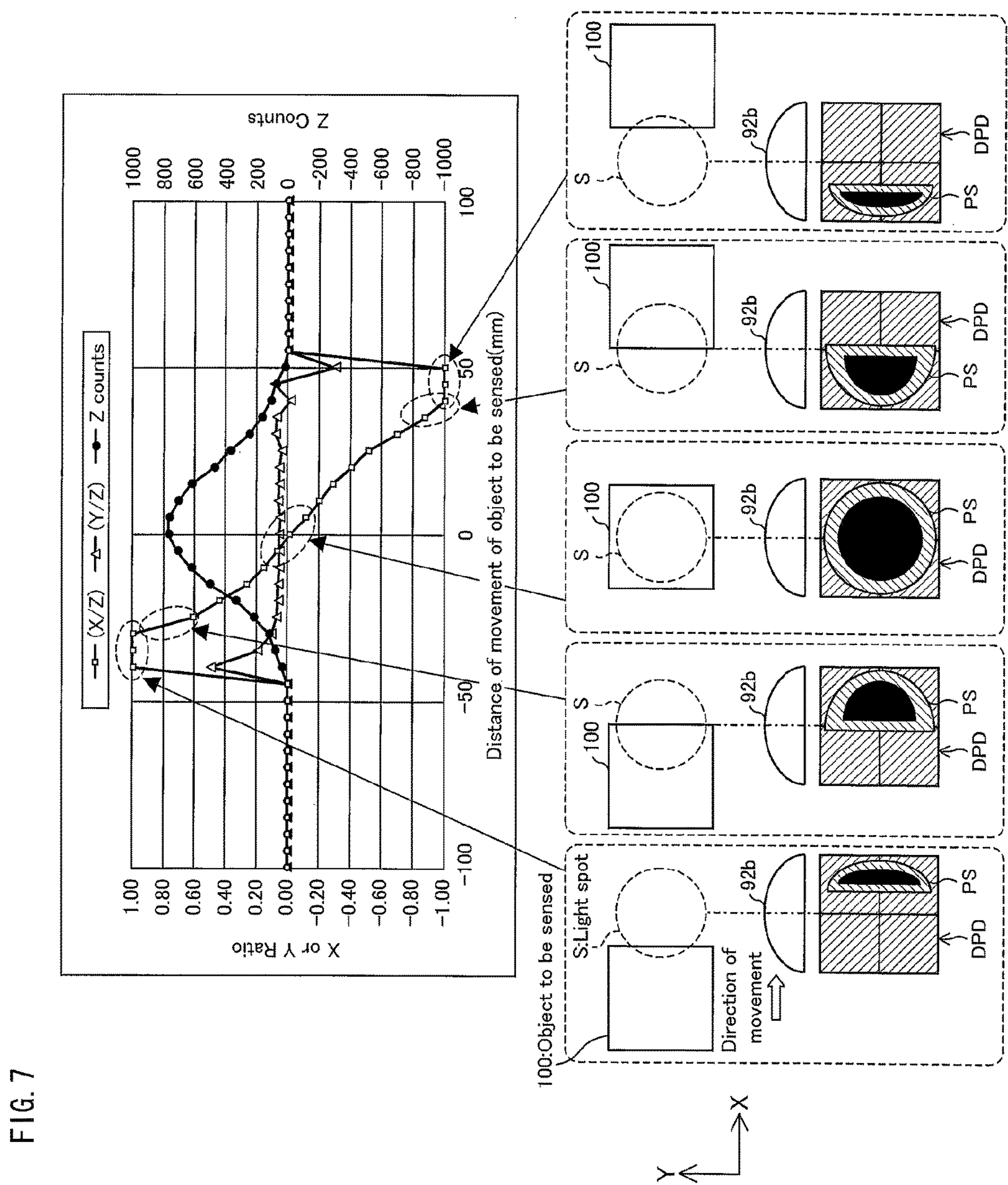
FIG. 7 schematically shows an operation in which an optical sensor in accordance with a comparative example of the optical sensor shown in FIG. 2 senses a movement of an object to be sensed.

FIG. 7 schematically shows an operation in which the optical sensor in accordance with the comparative example of the optical sensor 101 shown in FIG. 2 senses a movement of the object to be sensed 100. For example, a signal as shown in FIG. 7 is obtained as an actual output of a difference among photocurrents obtained from PDA to PDD. The optical sensor uses, as a transverse (X) detection signal, a signal in a ratio obtained by dividing a difference in output X between photocurrents obtained from the left and the right (L and R), respectively, of the segmented light-receiving element group DPD ((I_PDA+I_PDD)−(I_PDB+I_PDC)) by a sum of outputs Z from all the four light-receiving elements included in the segmented light-receiving element group DPD ((I_PDA+I_PDB+I_PDC+I_PDD)). Note here that I_PDA refers to a value of a photocurrent obtained from the light-receiving element PDA. Same applies to I_PDB to I_PDD. The direction of movement and the speed of movement of the object to be sensed 100 can be detected by detecting a change over time in value of X/Z.

Similarly, the optical sensor only needs to use, as a vertical (Y) detection signal, a signal in a ratio obtained by dividing a difference in output Y between photocurrents obtained from the top and the bottom (T and D), respectively, of the segmented light-receiving element group DPD ((I_PDA+I_PDB)−(I_PDC+I_PDD)) by the sum of outputs Z from all the four light-receiving elements included in the segmented light-receiving element group DPD ((I_PDA+I_PDB+I_PDC+I_PDD)).

As in the case of the optical sensor 101, a principle on which the optical sensor in accordance with the comparative example of the optical sensor 101 detects the direction of movement and the speed of movement of the object to be sensed is as described earlier. However, disturbance light such as artificial lighting or sunlight is actually present. Thus, even under such disturbance light, the optical sensor is required to operate without malfunctioning.

(Comparison with Optical Sensor 101)

The optical sensor in accordance with Comparative Example 1 detects the direction of movement of the object to be sensed 100 by use of all the light-receiving elements included in the segmented light-receiving element group DPD. Meanwhile, the optical sensor 101 detects the direction of movement of the object to be sensed 100 by use of only the light-receiving elements that are circularly provided at the edges of the region on which the reflected light from the object to be sensed 100 reflecting light emitted by the light-emitting element LED is incident. That is, the optical sensor 101 uses no light-receiving element that is provided in a region on which the reflected light that does not reflect entry/departure by movement of the object to be sensed 100 into/from the range of sensing by the optical sensor 101 is incident. According to this, as compared with the optical sensor in accordance with Comparative Example 1, the optical sensor 101 can further prevent, in sensing of the direction of movement of the object to be sensed 100, an adverse effect caused by light (disturbance light) that is different from the reflected light from the object to be sensed 100 reflecting light emitted by the light-emitting element LED and is incident from the outside of the optical sensor 101.

Further, as shown in FIG. 7, a ratio X/Z and a ratio Y/Z each have a great value when an edge of the object to be sensed 100 enters or departs from the light spot S. The above ratios obtained from the circularly-segmented light-receiving element group RDPD used for determination of the direction of the object to be sensed each remain unchanged from the great value (e.g., 1 or −1) even in a case where the optical sensor 101 of FIG. 1 includes the light-receiving elements (PDA3, PDB4, PDC1, and PDD2) provided at a central part of the circularly-segmented light-receiving element group RDPD. Thus, the optical sensor 101 does not deteriorate in accuracy with which to sense the direction of the object to be sensed. This allows the optical sensor 101 to prevent malfunction under disturbance light while maintaining accuracy with which to sense the direction of the object to be sensed.

Modified Example 1

A modified example of the present invention is described below with reference to FIG. 8. Note that for convenience, members having functions identical to those of the respective members described in Embodiment 1 are given respective identical reference numerals, and a description of those members is omitted here.

Figure 8:
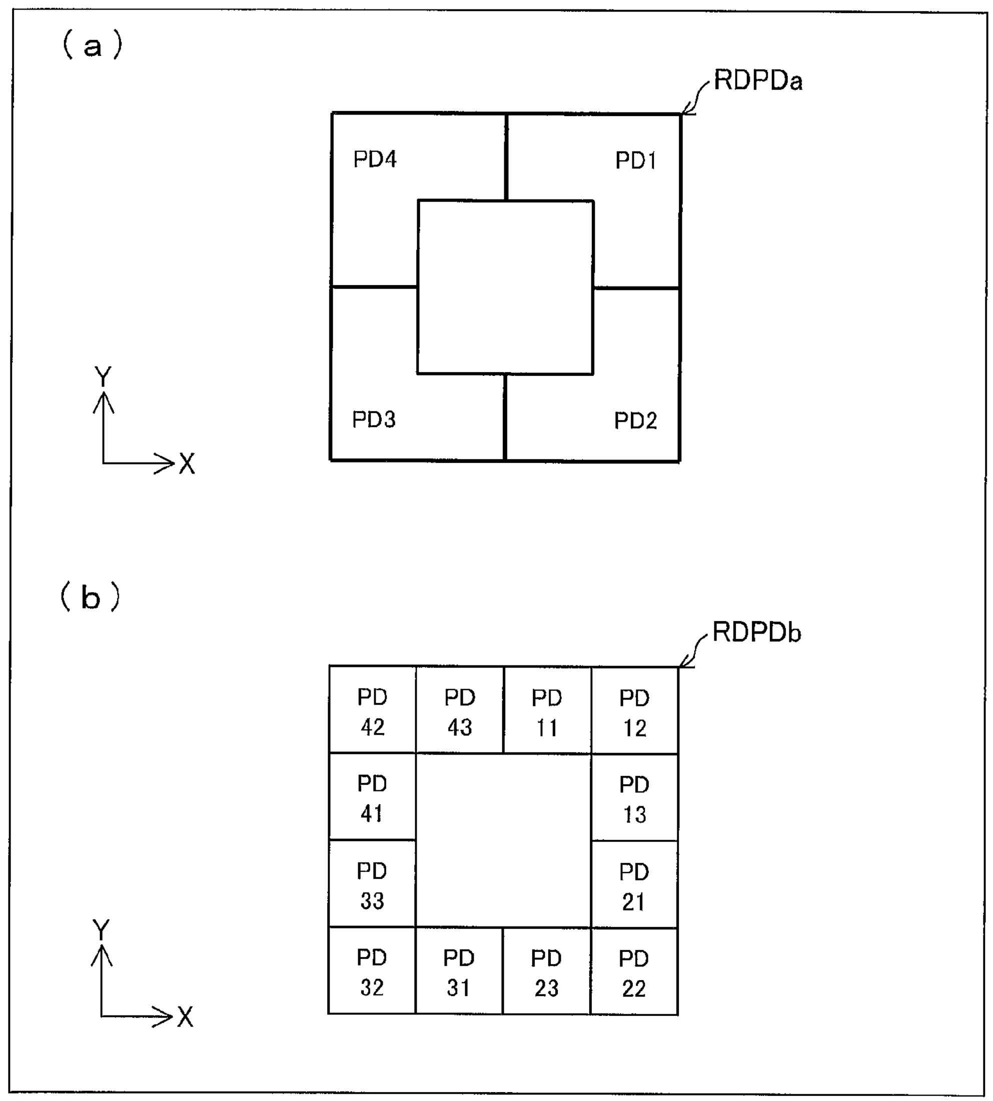
FIG. 8 is a plan view showing a planar configuration of a circularly-segmented light-receiving element group in accordance with a modified example of the circularly-segmented light-receiving element group shown in FIG. 1. (a) of FIG. 8 shows a circularly-segmented light-receiving element group including four light-receiving elements. (b) of FIG. 8 shows a circularly-segmented light-receiving element group including 12 light-receiving elements.

FIG. 8 is a plan view showing a planar configuration of a circularly-segmented light-receiving element group in accordance with a modified example of the circularly-segmented light-receiving element group RDPD shown in FIG. 1. (a) of FIG. 8 shows a circularly-segmented light-receiving element group RDPDa including four light-receiving elements. (b) of FIG. 8 shows a circularly-segmented light-receiving element group RDPDb including 12 light-receiving elements. The light-receiving elements included in the circularly-segmented light-receiving element group RDPD may be configured as shown in (a) of FIG. 8 or (b) of FIG. 8.

According to (a) of FIG. 8, the circularly-segmented light-receiving element group RDPDa is made up of L-shaped light-receiving elements (first light-receiving elements) PD1 to PD4. According to (b) of FIG. 8, the circularly-segmented light-receiving element group RDPDb is made up of light-receiving elements (first light-receiving elements) PD11 to PD13, PD21 to PD23, PD31 to PD33, and PD41 to PD43 into which the light-receiving elements PD1 to PD4 shown in (a) of FIG. 8 are further segmented.

The optical sensor 101 may be configured by replacing the circularly-segmented light-receiving element group RDPD shown in FIG. 1 with the circularly-segmented light-receiving element group RDPDa shown in (a) of FIG. 8 or the circularly-segmented light-receiving element group RDPDb shown in (b) of FIG. 8. That is, according to the optical sensor 101, a shape of the light-receiving elements included in the circularly-segmented light-receiving element group RDPD is freely selectable, and the circularly-segmented light-receiving element group RDPD can be made up of the light-receiving elements that vary in shape. This allows the shape of the light-receiving elements included in the circularly-segmented light-receiving element group RDPD to be selected in accordance with a shape of the region on which the reflected light from the object to be sensed 100 reflecting light emitted by the light-emitting element LED is incident, so that it is possible to, for example, maximize a received amount of the reflected light from the object to be sensed 100, and minimize disturbance light.

Embodiment 2

A second embodiment of the present invention is described below with reference to FIGS. 9 through 12. Note that for convenience, members having functions identical to those of the respective members described in Embodiment 1 are given respective identical reference numerals, and a description of those members is omitted here.

<Configuration of Optical Sensor 104>

Figure 9:
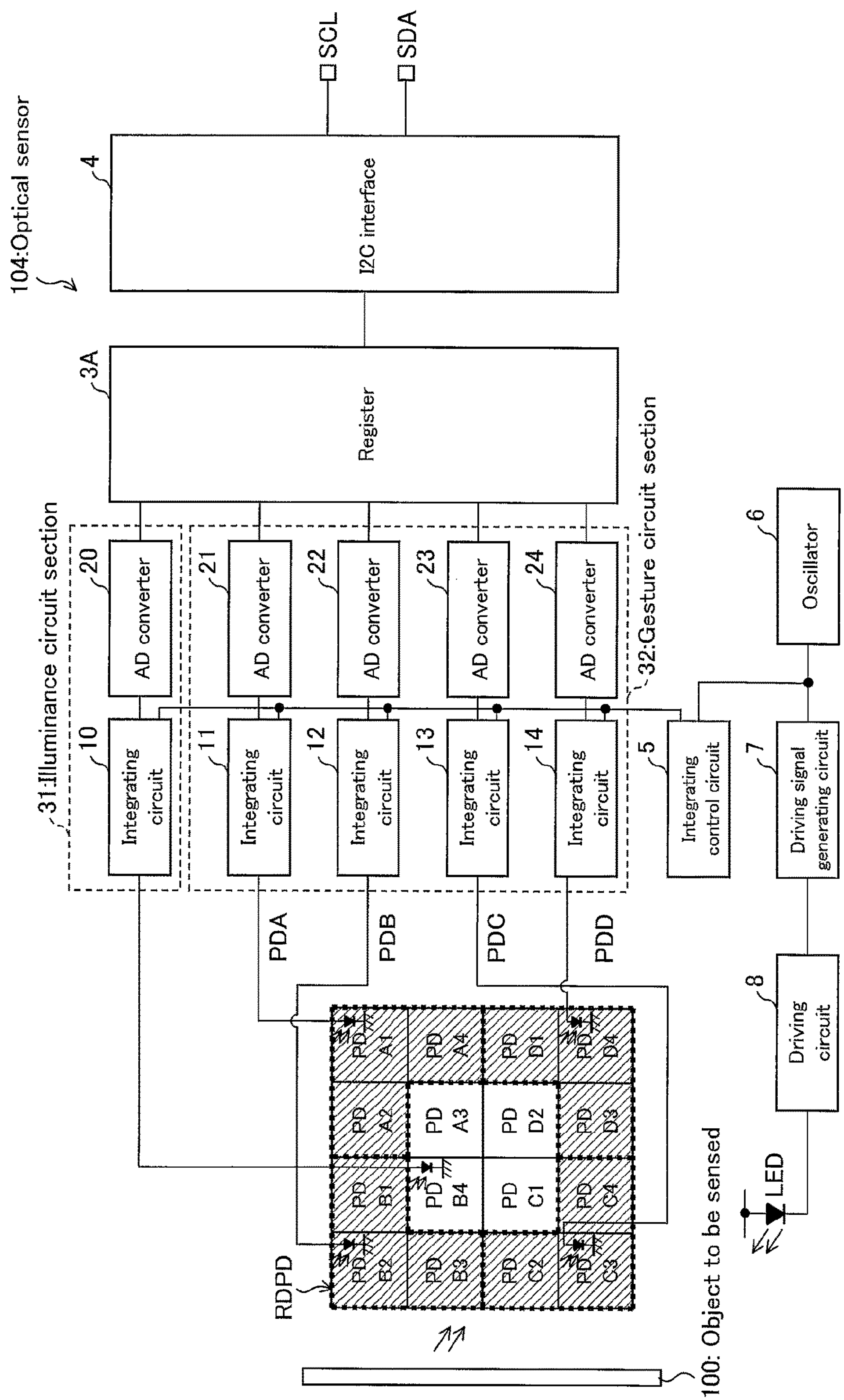
FIG. 9 schematically shows a configuration of an optical sensor in accordance with a second embodiment of the present invention.

FIG. 9 schematically shows a configuration of an optical sensor 104 in accordance with the second embodiment of the present invention. As shown in FIG. 9, the optical sensor 104 includes a register 3A, an 12C interface 4, an integrating control circuit (integrating control section) 5, an oscillator 6, a driving signal generating circuit 7, and a driving circuit (driving section) 8. The optical sensor 104 further includes a circularly-segmented light-receiving element group RDPD, a gesture circuit section 32, integrating circuits (integrating sections) 11 to 14 of the gesture circuit section 32, AD converters 21 to 24, an illuminance circuit section (illuminance detecting section) 31, an integrating circuit (integrating section) 10 of the illuminance circuit section 31, and an AD converter 20. The optical sensor 104 and the optical sensor 101 are identical in the other configurations.

Output voltages of the integrating circuits 10 to 14 are converted into digital data by the respective AD converters 20 to 24, and the digital data into which the output voltages have been converted is stored in the register 3A. The digital data stored in the register 3A can be taken out to outside by the I2C interface 4. On the light-emitting side, an LED driving signal is generated in accordance with a reference clock sent from the oscillator 6, and a pulse current is generated by the driving circuit 8, so that a light-emitting element LED emits light and an optical pulse signal is outputted.

The circularly-segmented light-receiving element group RDPD (light-receiving elements PDA1, PDA2, PDA4, PDB1 to PDB3, PDC2 to PDC4, PDD1, PDD3, and PDD4) is used for detection of a direction of movement (gesture) of an object to be sensed 100, and light-receiving elements (second light-receiving elements) PDA3, PDB4, PDC1, and PDD2 provided in a region inside (at a central part of) a region in which the circularly-segmented light-receiving element group RDPD is provided are used for illuminance detection, so that an optical sensor in which a gesture sensor and an illuminance sensor are integrated is achieved.

That is, the optical sensor 104 not only has the configuration of the optical sensor 101 but also further includes the light-receiving elements PDA3, PDB4, PDC1, and PDD2 provided in the region inside the region in which the circularly-segmented light-receiving element group RDPD is provided, and the illuminance circuit section 31, which detects an illuminance upon receiving photocurrents generated by the light-receiving elements PDA3, PDB4, PDC1, and PDD2.

(Configuration of Integrating Circuit)

Figure 10:
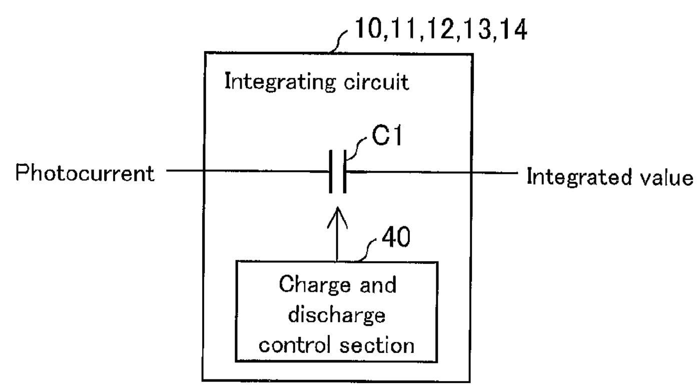
FIG. 10 is a block diagram showing a configuration of an integrating circuit in the optical sensor shown in FIG. 9.

FIG. 10 is a block diagram showing a configuration of each of the integrating circuits 10, 11, 12, 13, and 14 in the optical sensor 104 shown in FIG. 9. As shown in FIG. 10, the integrating circuits each have a capacitor (integrating section) C1. The capacitor C1 is charged in response to a photocurrent generated by the circularly-segmented light-receiving element group RDPD, and discharges an electric charge in a form of an integrated value. The charge and discharge is controlled by a charge and discharge control section (integrating control section) 40. Note here that the charge and discharge control section 40 may be the integrating control circuit 5 shown in FIG. 9.

That is, according to the optical sensor 104, the integrating circuits 10, 11, 12, 13, and 14 are each the capacitor C1 charged and discharged by an electric charge equivalent to a strength of the photocurrent, and the charge and discharge control section 40 controls the charge and discharge of the capacitor C1. As described later, the charge and discharge control section 40 may control the charge and discharge of the capacitor C1 by charging or discharging the capacitor C1 during a period in which the light-emitting element LED is on, and discharging or charging the capacitor C1 during a period in which the light-emitting element LED is off.

The configuration allows the integrating circuits 10, 11, 12, 13, and 14 to be simply configured to charge and discharge the capacitor C1 by use of a photocurrent generated by a light-receiving element. That is, the configuration makes it possible to produce the optical sensor 104 at low cost.

Namely, the optical sensor 104 can still more accurately sense a direction of movement of an object to be sensed even in a case where disturbance light is present, and the optical sensor 104 can be made low in cost.

Modified Example 1 of Integrating Circuit

Figure 11:
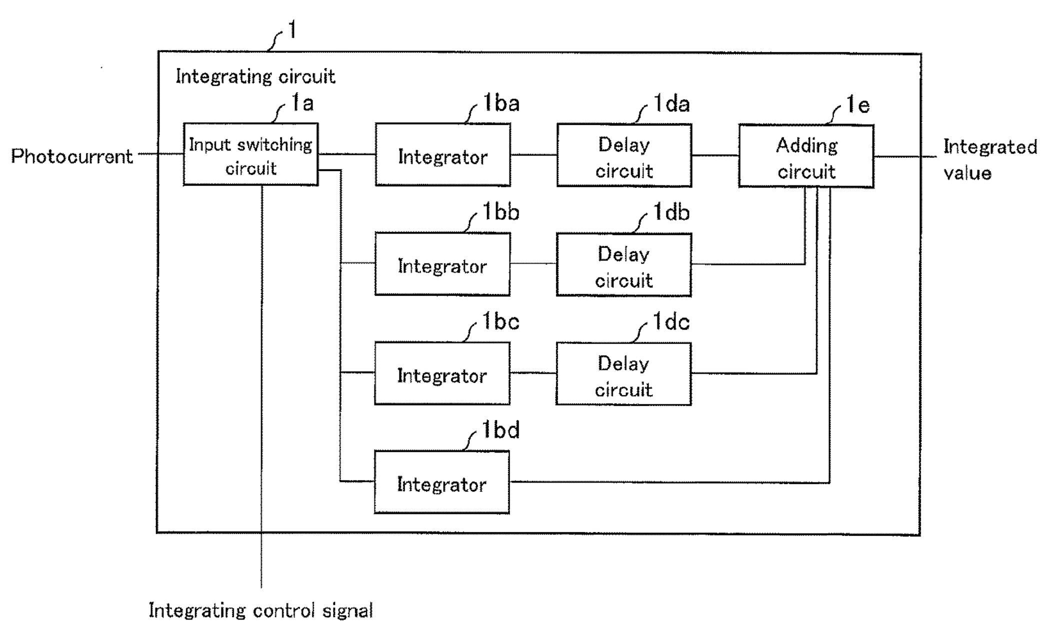
FIG. 11 is a block diagram showing another configuration of the integrating circuit in the optical sensor shown in FIG. 9.

FIG. 11 is a block diagram showing another configuration of the integrating circuit 1 in the optical sensor 104 shown in FIG. 9. The integrating circuits 10 to 14 described earlier may be replaced with one integrating circuit 1 shown in FIG. 11. As shown in FIG. 11, the integrating circuit 1 includes an input switching circuit 1*a*, integrators 1*ba* to 1*bd*, delay circuits 1*da* to 1*dc*, and an adding circuit 1*e*.

The integrators 1*ba* and 1*bd* are each a circuit that integrates, in a negative (or positive) direction, a photocurrent inputted thereto. The integrators 1*bb* and 1*bc* are each a circuit that integrates, in a positive (or negative) direction, a photocurrent inputted thereto.

The input switching circuit 1*a* is a circuit that alternately switches input paths in four consecutive integral periods so that the photocurrent from the circularly-segmented light-receiving element group RDPD is inputted to any one of the integrators 1*ba* to 1*bd*. The input switching circuit 1*a* is so controlled by an integrating control signal supplied from the integrating control circuit 5, which has been described earlier, as to switch among inputting the photocurrent to the integrator 1*ba*, inputting the photocurrent to the integrator 1*bb*, inputting the photocurrent to the integrator 1*bc*, and inputting the photocurrent to the integrator 1*bd*.

The integrating control signal defines four integral periods INT1 to INT4 (described later) in which integration is executed, and also defines an integral cycle with the integral periods INT1 to INT4 as one cycle. The integral periods INT1 to INT4 are each a period during which the light-emitting element LED is on and off. The integral periods INT1 to INT4 are provided in a first period T1, a second period T2, a third period T3, and a fourth period T4, respectively. The first period T1, the second period T2, the third period T3, and the fourth period T4 will be described later.

The delay circuits 1*da* to 1*dc* are circuits that cause integrated values outputted from the respective integrators 1*ba* to 1*bc* to be delayed by respective three to one integral periods.

The adding circuit 1*e* is a circuit that adds together integrated values respectively outputted from the delay circuits 1*da* to 1*dc* and the integrator 1*bd*.

In the integrating circuit 1 thus configured, the integrators 1*ba* and 1*bd* integrate the photocurrents in a negative direction or a positive direction in a state in which the input switching circuit 1*a* has switched input paths so that the photocurrents are inputted to the integrators 1*ba* and 1*bd*. An integrated value outputted from the integrator 1*ba* is delayed by three integral periods by the delay circuit 1*da*. Meanwhile, the integrators 1*bb* and 1*bc* integrate the photocurrents in the positive direction or the negative direction in a state in which the input switching circuit 1*a* has switched input paths so that the photocurrents are inputted to the integrators 1*bb* and 1*bc*. Integrated values outputted from the integrators 1*bb* and 1*bc* are delayed by respective two and one integral periods by the respective delay circuits 1*db* and 1*dc*.

Modified Example 2 of Integrating Circuit

Figure 12:
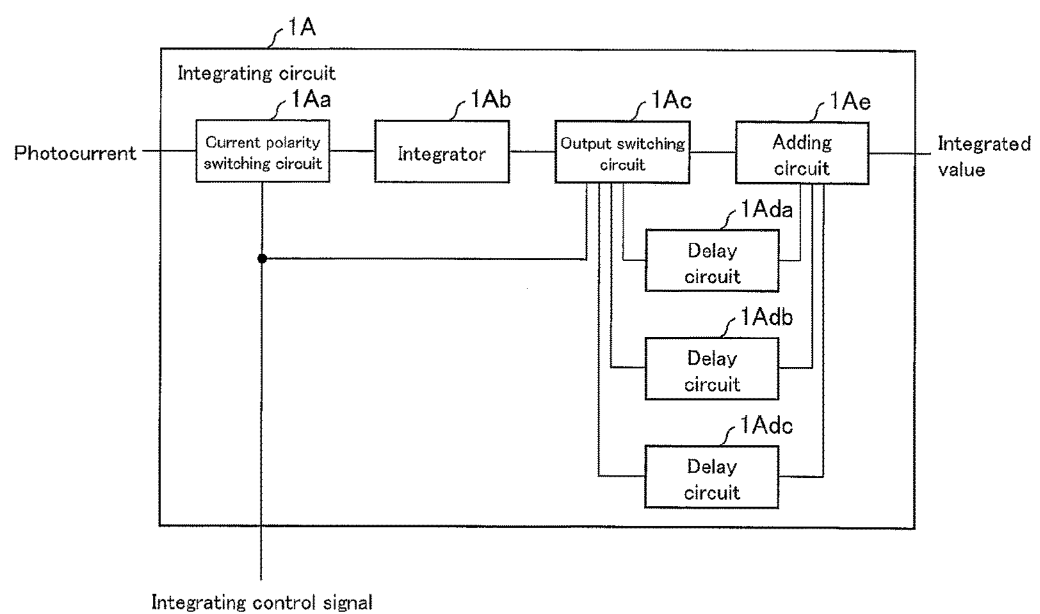
FIG. 12 is a block diagram showing an integrating circuit in accordance with a modified example of the integrating circuit shown in FIG. 11.

FIG. 12 is a block diagram showing an integrating circuit 1A in accordance with a modified example of the integrating circuit 1 shown in FIG. 11. The integrating circuit 1 described earlier may be such an integrating circuit 1A as that shown in FIG. 12. As shown in FIG. 12, the integrating circuit 1A includes a current polarity switching circuit 1Aa, an integrator 1Ab, an output switching circuit 1Ac, delay circuits 1Ada to 1Adc, and an adding circuit 1Ae.

The current polarity switching circuit 1Aa is a circuit that alternately switches the polarities of a photocurrent from the circularly-segmented light-receiving element group RDPD in four consecutive integral periods. The current polarity switching circuit 1Aa is so controlled by the integrating control signal, described above, as to switch the polarities of the photocurrent.

The integrator 1Ab is a circuit that integrates a photocurrent outputted from the current polarity switching circuit 1Aa.

The output switching circuit 1Ac is a circuit that alternately switches output paths in four consecutive integral periods so that an integrated value outputted from the integrator is outputted to any one of the delay circuits 1Ada to 1Adc and the adding circuit 1Ae. The output switching circuit 1Ac is so controlled by the integrating control signal, described above, as to switch output paths.

The delay circuits 1Ada to 1Adc are circuits that cause integrated values outputted from the output switching circuit 1Ac to be delayed by respective one to three integral periods.

The adding circuit 1Ae is a circuit that adds together the integrated values respectively outputted from the delay circuits 1Ada to 1Adc and the output switching circuit 1Ac.

In the integrating circuit 1A thus configured, a photocurrent outputted as a negative (or positive) photocurrent from the current polarity switching circuit 1Aa is integrated by the integrator 1Ab. An integrated value outputted from the integrator 1Ab is outputted via the output switching circuit 1Ac directly to the adding circuit 1Ae via no delay circuit. Alternatively, the integrated value is outputted to the delay circuit 1Adc via the output switching circuit 1Ac, is delayed by three integral periods by the delay circuit 1Adc, and is outputted to the adding circuit 1Ae.

Meanwhile, a photocurrent outputted as a positive (or negative) photocurrent from the current polarity switching circuit 1Aa is integrated by the integrator 1Ab. An integrated value outputted from the integrator 1Ab is outputted to the delay circuit 1Ada via the output switching circuit 1Ac, is delayed by one integral period by the delay circuit 1Ada, and is outputted to the adding circuit 1Ae. Alternatively, the integrated value is outputted to the delay circuit 1Adb via the output switching circuit 1Ac, is delayed by two integral periods by the delay circuit 1Adb, and is outputted to the adding circuit 1Ae.

Integrated values outputted from the delay circuits 1Ada to 1Adc in the integral periods INT3 to INT1 and an integrated value output from the output switching circuit 1Ac in the integral period INT4 are added together by the adding circuit 1Ae. By thus adding together an integrated value of a positive-polarity photocurrent and an integrated value of a negative-polarity photocurrent, an integrated value of a difference between the two integrated values is obtained.

The integrating circuit 1A can output an integrated value equivalent to that which is outputted by the integrating circuit 1 shown in FIG. 11. Further, unlike the integrating circuit 1, which has four integrators (namely the integrators 1*ba* to 1*bd*), the integrating circuit 1A has one integrator (namely the integrator 1Ab). This makes it possible to achieve a simple circuit configuration.

(Configuration of AD Converter)

The AD converters 20 to 24 shown in FIG. 9 are circuits that convert, into respective digital values, integrated values outputted from the respective integrating circuits 10 to 14 (integrating circuit 1, 1A). The AD converters 20 to 24 convert, into respective digital integrated values, a sum of the positively or negatively integrated values outputted from the respective integrating circuits 10 to 14 (integrating circuit 1, 1A) in the integral periods INT1 to INT4 (described earlier), and outputs the digital integrated values.

(Configuration of I2C Interface)

The I2C interface 4 is a circuit that causes a digital value outputted from the register 3A to be outputted as serial data SDA in synchronization with a serial clock SCL sent from an outside source.

(Configuration of Oscillator and Integrating Control Circuit)

The oscillator 6 is a circuit that generates a reference clock of a predetermined cycle.

In accordance with the reference clock from the oscillator 6, the integrating control circuit 5 outputs an integrating control signal that is at a high level during each of the integral periods INT1 to INT4 (described later) in which integration is performed and that is at a low level during a non-integral period in which integration is not performed. The integral periods INT1 to INT4 are set as periods that are shorter than the first to fourth periods T1 to T4 (described later) during which the light-emitting element LED is on or off.

(Configuration of Driving Signal Generating Circuit and Driving Circuit)

The driving signal generating circuit 7 is a circuit that generates, in accordance with the reference clock sent from the oscillator 6, a driving signal by which the light-emitting element LED is driven. The driving signal is a signal that causes the light-emitting element LED to be turned on and off in a cycle in units of the first period T1, the second period T2, the third period T3, and the fourth period T4. The first to fourth periods T1 to T4 correspond to the on periods and the off periods.

In the following description, the light-emitting LED is driven so that the light-emitting element LED is off during the first period T1 and the fourth period T4 and on during the second period T2 and the third period T3. However, a driving form is not limited to such drive control. Opposite to the above driving form, the light-emitting LED may be driven so that the light-emitting element LED is on during the first period T1 and the fourth period T4 and off during the second period T2 and the third period T3.

The driving circuit 8 is a circuit that generates, in accordance with the driving signal generated by the driving signal generating circuit 7, a driving current by which the light-emitting element LED is driven. The driving current is a pulse current, and is supplied to the light-emitting element LED as an optical pulse signal.

<Operation of Optical Sensor 104>

According to the configuration, the optical sensor 104 can be used as, for example, an illuminance sensor, an RGB color sensor, or a proximity sensor by causing the light-receiving elements PDA3, PDB4, PDC1, and PDD2 to receive light outside the optical sensor 104 and causing the illuminance circuit section 31 to detect an illuminance.

In particular, in a case where the optical sensor 104 includes a light-receiving lens portion 92*b* (see FIG. 2) that has one of focal points which one is located in a region on which reflected light from the object to be sensed 100 is incident and that collects the reflected light in the region, it is possible to efficiently receive light outside the optical sensor 104 (an illuminance signal) by providing the light-receiving lens portion 92*b* so that the reflected light is collected by the light-receiving elements PDA3, PDB4, PDC1, and PDD2. That is, the light-receiving elements PDA3, PDB4, PDC1, and PDD2, which are provided directly below a center of the light-receiving lens portion 92*b*, can efficiently receive the illuminance signal (see FIG. 2).

<Effect of Optical Sensor 104>

According to Embodiment 2, the optical sensor 104 can accurately sense the direction of movement of the object to be sensed 100 even in a case where disturbance light is present, and the optical sensor 104 can be used as an illuminance sensor, an RGB color sensor, or a proximity sensor.

Further, in a case where the optical sensor 104 includes the light-receiving lens portion 92*b* (see FIG. 2) that has one of focal points which one is located in the region on which the reflected light from the object to be sensed 100 is incident and that collects the reflected light in the region, the optical sensor 104 can accurately sense the direction of movement of the object to be sensed 100 even in a case where disturbance light is present, and the optical sensor 104 can be suitably used as an illuminance sensor, an RGB color sensor, or a proximity sensor.

Embodiment 3

A third embodiment of the present invention is described below with reference to FIGS. 13 and 14. Note that for convenience, members having functions identical to those of the respective members described in Embodiments 1 and 2 are given respective identical reference numerals, and a description of those members is omitted here.

<Configuration of Optical Sensor 104*a*>

Figure 13:
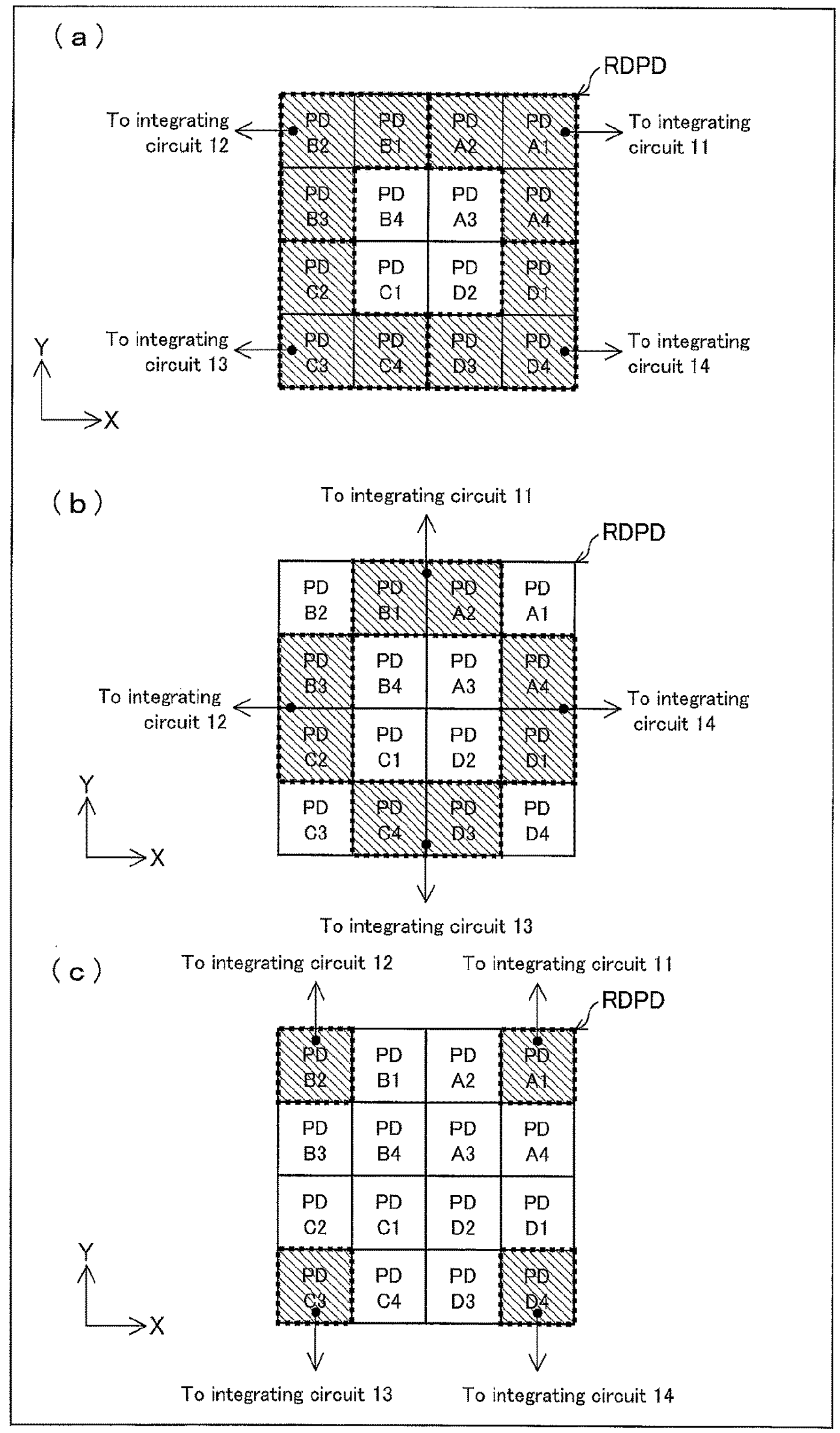
FIG. 13 is a plan view schematically showing a form of use of a circularly-segmented light-receiving element group in an optical sensor in accordance with a third embodiment of the present invention. (a) of FIG. 13 shows a form of use of 12 light-receiving elements. (b) of FIG. 13 shows a form of use of eight light-receiving elements. (c) of FIG. 13 shows a form of use of four light-receiving elements.

FIG. 13 is a plan view schematically showing a form of use of a circularly-segmented light-receiving element group RDPD in an optical sensor 104*a* in accordance with the third embodiment of the present invention. (a) of FIG. 13 shows a form of use of 12 light-receiving elements. (b) of FIG. 13 shows a form of use of eight light-receiving elements. (c) of FIG. 13 shows a form of use of four light-receiving elements.

FIG. 14 is a block diagram showing a configuration of the optical sensor 104*a* in accordance with the third embodiment of the present invention.

The optical sensor 104*a*, which is similar in configuration to the optical sensor 104 shown in FIG. 9, is different from the optical sensor 104 in that the optical sensor 104*a* is configured such that light-receiving elements (a light-receiving region) included in the circularly-segmented light-receiving element group RDPD are connected to a light-receiving region switching circuit (photocurrent selecting section) 50 via respective input lines, and integrating circuits 10 to 14 each receive a signal from any one of the light-receiving elements. Under a situation in which disturbance light is intense, a gesture may be preferably detected by use of fewer light-receiving elements. In this case, for example, the integrating circuits 11 to 14 receive respective four photocurrents (current signals) from light-receiving elements PDA2+PDB1, PDB3+PDC2, PDC4+PDD3, and PDD1+PDA4 (see (b) of FIG. 13), or respective photocurrents generated by light-receiving elements at four corners (PDA1, PDB2, PDC3, and PDD4) (see (c) of FIG. 13).

That is, the optical sensor 104*a* further includes a light-receiving region switching circuit 50 that selects, from the photocurrents generated by the circularly-segmented light-receiving element group RDPD, a photocurrent to supply to a gesture circuit section 32.

<Operation of Optical Sensor 104*a*>

According to the configuration, the light-receiving region switching circuit 50 selects a photocurrent to supply to the gesture circuit section 32. This allows the gesture circuit section 32 to selectively use only a specific light-receiving element included in the circularly-segmented light-receiving element group RDPD. Note here that photocurrents caused by movement of an object to be sensed 100 may be generated only by a part of the light-receiving elements, depending on a positional relationship between the optical sensor 104*a* and the object to be sensed 100. Thus, by selectively using only a light-receiving element that generates a photocurrent caused by movement of the object to be sensed 100, the gesture circuit section 32 can prevent, in sensing of a direction of movement of the object to be sensed 100, an adverse effect caused by light (disturbance light) that is different from reflected light from the object to be sensed 100 reflecting light emitted by the light-emitting element LED and is incident from an outside of the optical sensor 104*a*. That is, it is possible to increase S/N (Signal to Noise ratio) in sensing by the optical sensor 104 of the direction of movement of the object to be sensed.

In other words, though a current signal used to determine a gesture is made lower in level, a disturbance light component is further reduced in accordance with a smaller light-receiving region. This allows an increase in entire S/N, though the increase depends on an optical system of the optical sensor 104*a* and/or the positional relationship between the optical sensor 104*a* and the object to be sensed 100.

The optical sensor 104*a* may further include a register 3A that retains information on the circularly-segmented light-receiving element group RDPD generating a photocurrent selected by the light-receiving region switching circuit 50. According to the configuration, the light-receiving region switching circuit 50 can select a photocurrent at a high speed with reference to the register 3A even in a case where the positional relationship between the optical sensor 104*a* and the object to be sensed 100 changes. This allows only a light-receiving element that generates a photocurrent caused by movement of the object to be sensed 100 to be selectively and accurately used in accordance with the change.

Note here that the light-receiving region switching circuit 50 selects a photocurrent by obtaining information on the circularly-segmented light-receiving element group RDPD from the register 3A via an input line 51.

Note also that likelihood of disturbance light saturation in the integrating circuits is increased by causing an intensity of disturbance light to change a light-receiving region and limit an input current. This allows a case where a capacitor is used in an integrating circuit as shown in FIG. 10 to less require the integrating circuit to have a large integral capacitance as compared with a conventional case (see FIG. 4) where light is received by the segmented light-receiving element group DPD made up of four light-receiving elements.

<Effect of Optical Sensor 104*a*>

According to Embodiment 3, the optical sensor 104*a* can further accurately sense the direction of movement of the object to be sensed 100 even in a case where disturbance light is present.

Further, the optical sensor 104*a* can accurately sense the direction of movement of the object to be sensed 100 in accordance with the change in positional relationship between the optical sensor 104*a* and the object to be sensed 100.

Embodiment 4

A fourth embodiment of the present invention is described below with reference to FIGS. 15 through 17. Note that for convenience, members having functions identical to those of the respective members described in Embodiments 1 through 3 are given respective identical reference numerals, and a description of those members is omitted here.

<Change in Disturbance Light>

Embodiments 1 through 3 are techniques that are particularly effective in a case where disturbance light does not change (it is also possible to state that disturbance light is direct-current (DC) light). However, in a case where disturbance light changes during a period in which reflected light from an object to be sensed reflecting light emitted by a light-emitting element is sensed, the change may prevent an optical sensor from accurately sensing a direction of movement of the object to be sensed and cause the optical sensor to malfunction. A light source of disturbance light thus changing can be exemplified by an illuminator, particularly by an inverter fluorescent light.

Usually, light from an illuminator varies in brightness at twice as high a frequency (100 Hz or 120 Hz) as a commercial frequency (50 Hz or 60 Hz). Further, an optical waveform of an inverter fluorescent light is such an optical waveform that a frequency of several tens of kilohertz has been superposed on the commercial frequency. Under such a light source, the intensity of disturbance light often varies with time during sensing by an optical sensor of a direction of movement of an object to be sensed.

Further, in a situation in which disturbance light (disturbance DC light) such as sunlight that does not change at a high speed is incident on an optical sensor, the disturbance DC light is blocked by movement of an object to be sensed, so that a situation may arise as if disturbance light incident on an optical sensor changed (a situation equivalent to a change in disturbance light may arise). Note here that such disturbance light is considered to change so as to decrease at a constant speed or increase at a constant speed in a case where the object to be sensed moves at a constant speed.

The following description refers to a decrease at a constant speed or an increase at a constant speed in such disturbance light as a constant decrease or a constant increase. The following description further shows a form of integration of photocurrent values by which form disturbance light that changes by a constant decrease or a constant increase can be cancelled. The integration in the form is performed by, for example, the integrating circuits 10 to 14 shown in FIG. 9 or FIG. 14.

<Form of Integration of Photocurrent Value>

Figure 15:
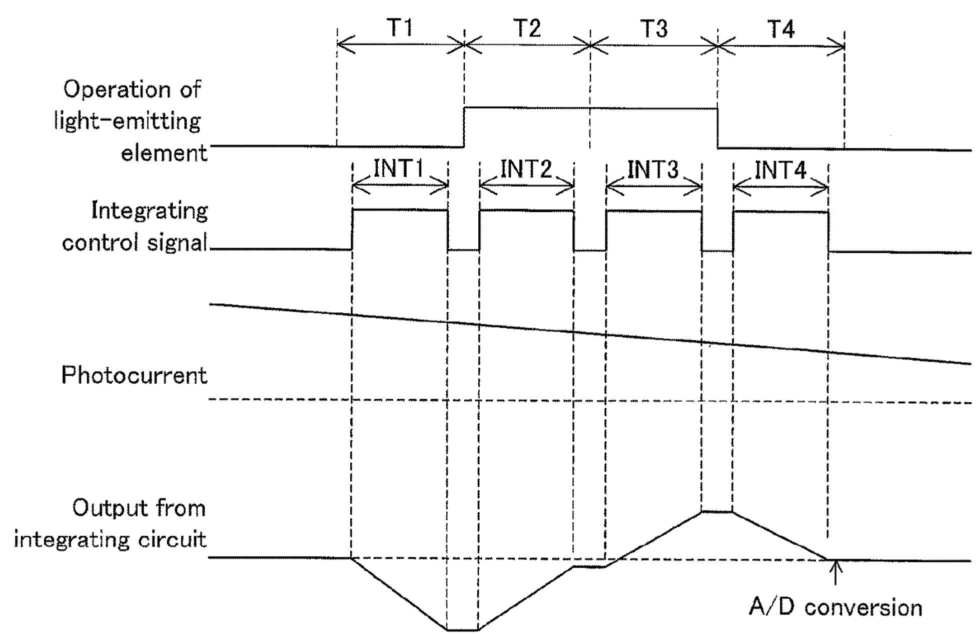
FIG. 15 is a timing chart showing a form of integration of photocurrent values in accordance with a fourth embodiment of the present invention.

FIG. 15 is a timing chart showing a form of integration of photocurrent values in accordance with the fourth embodiment of the present invention. FIG. 15 shows a situation in which a photocurrent caused by disturbance light is subjected to a constant decrease. As shown in FIG. 15, a light-emitting element on period and a light-emitting element off period are repeated, and a photocurrent generated by a light-receiving element during the light-emitting element on period is integrated in a positive direction, and a photocurrent generated by a light-receiving element during the light-emitting element off period is integrated in a negative direction. First, such a form of integration allows a photocurrent caused by disturbance light to be perfectly cancelled in a case where disturbance light does not change (disturbance light is DC light).

Further, a light-emitting element off period (T1), a light-emitting element on period (T2), a light-emitting element on period (T3), and a light-emitting element off period (T4) are regarded as one cycle. Here, under a condition in which disturbance light is subjected to a constant decrease, in a case where integration is performed in the negative direction during the light-emitting element off period (T1) (INT1) and integration is performed in the positive direction during the light-emitting element on period (T2) (INT2), a negative output remains. Then, in a case where integration is performed in the positive direction during the light-emitting element on period (T3) (INT3) and integration is performed in the negative direction during the light-emitting element off period (T4) (INT4), a positive output is obtained during INT3 and INT4, so that disturbance light is cancelled in one cycle of INT1 to INT4. In a case where a final integrated value is subjected to A/D conversion in such a form of integration, disturbance light is cancelled. This makes it possible to obtain a digital value of a photocurrent in which a movement of an object to be sensed is actually reflected.

Assume here that an output signal is desired to be increased. In this case, only a component attributed to reflected light from an object to be sensed can be integrated by repeating integration in several cycles assuming that a light-emitting element off period, a light-emitting element on period, a light-emitting element on period, and a light-emitting element off period are regarded as one cycle.

Further, a cycle of integral periods (described earlier) and a cycle of light-emitting element on and off periods (described earlier) may be, for example, 50 kHz or more in frequency terms, or a frequency much higher than 50 kHz. As the cycle of light-emitting element on and off periods is made shorter (a frequency into which the cycle has been converted is made higher), a movement of an object to be sensed can be sensed by an optical sensor even in a situation in which disturbance light (noise) that changes at a high speed is incident on the optical sensor.

Furthermore, in a case where a timing of turning on and turning off of a light-emitting element is changed as described earlier and a direction of integration is changed in accordance with the change, disturbance light that is subjected to a constant decrease can be cancelled with no use of, for example, complicated signal calculation. Moreover, disturbance light that is subjected to a constant increase can also be cancelled by the form of integration (described earlier).

In addition, disturbance light that is subjected to a constant decrease or a constant increase can also be similarly cancelled by regarding a light-emitting element on period, a light-emitting element off period, a light-emitting element off period, and a light-emitting element on period as the one cycle.

That is, the optical sensor 104 shown in FIG. 9 or the optical sensor 104*a* shown in FIG. 14 may further include: a driving circuit (driving section) 8 that drives the light-emitting element in the first period T1, the second period T2, the third period T3, and the fourth period T4, which are consecutive, so that the light-emitting element is turned on or off during the first period and the fourth period and the light-emitting element is turned off or on during the second period and the third period; the integrating circuits (integrating sections) 10 to 14 each of which integrates values of the photocurrents; and an integrating control circuit (integrating control section) 5 that controls the integrating circuits (integrating sections) 10 to 14 so that the integrating circuits (integrating sections) 10 to 14 each perform integration in a positive direction or a negative direction during a period in which the light-emitting element LED is on and the integrating circuits (integrating sections) 10 to 14 each perform integration in the negative direction or the positive direction during a period in which the light-emitting element LED is off.

According to the configuration, in a case where light (disturbance light) that is different from reflected light from an object to be sensed 100 reflecting light emitted by a light-emitting element LED and is incident from an outside of the optical sensor is subjected to a constant decrease or a constant increase in the first period, the second period, the third period, and the fourth period, which are consecutive, the integrating control circuit 5 can control the integrating circuits 10 to 14 so that a value obtained by integration by the integrating circuits 10 to 14 of values of photocurrents caused by the disturbance light is 0. This allows the optical sensor 104 or the optical sensor 104*a* to eliminate, in sensing of a direction of movement of the object to be sensed 100, an adverse effect caused by disturbance light subjected to a constant decrease or a constant increase. That is, the optical sensor 104 or the optical sensor 104*a* can cancel disturbance light subjected to a constant decrease or a constant increase.

<Effect of Form of Integration of Photocurrent Value in Embodiment 4>

According to Embodiment 4, the optical sensor 104 or the optical sensor 104*a* can still more accurately sense a direction of movement of an object to be sensed even in a case where disturbance light subjected to a constant decrease or a constant increase is present.

(Effect Yielded by Case of Integrating Circuit being Capacitor)

The integrating circuits 10 to 14 each may be the capacitor C1 as shown in FIG. 10, the capacitor C1 being charged and discharged by an electric charge equivalent to a photocurrent, and the integrating control circuit 5 may be the charge and discharge control section 40, which controls the charge and discharge of the capacitor C1 by charging or discharging the capacitor C1 during a period in which the light-emitting element LED is on, and discharging or charging the capacitor C1 during a period in which the light-emitting element LED is off.

The configuration allows the integrating circuits 10 to 14 to be simply configured to charge and discharge the capacitor C1 by use of a photocurrent generated by a light-receiving element. That is, the configuration makes it possible to produce the optical sensor 104 or the optical sensor 104*a* at low cost.

Namely, the optical sensor 104 or the optical sensor 104*a* can still more accurately sense the direction of movement of the object to be sensed 100 even in a case where disturbance light subjected to a constant decrease or a constant increase is present, and the optical sensor 104 or the optical sensor 104*a* can be made low in cost.

In particular, in a case where the optical sensor includes the light-receiving region switching circuit 50 shown in FIG. 14, the gesture circuit section 32 can reduce (i) a photocurrent to be used and (ii) charge and discharge amounts of the capacitor C1 by selectively using only a light-receiving element included in the circularly-segmented light-receiving element group RDPD by which a photocurrent caused by movement of the object to be sensed 100 is generated. This makes it unnecessary for the optical sensor to use a large capacitor as an integrating circuit.

Namely, the optical sensor 104 or the optical sensor 104*a* can still more accurately sense a direction of movement of the object to be sensed 100 even in a case where disturbance light subjected to a constant decrease or a constant increase is present, and the optical sensor 104 or the optical sensor 104*a* can be made lower in cost.

Comparative Example 2

Figure 16:
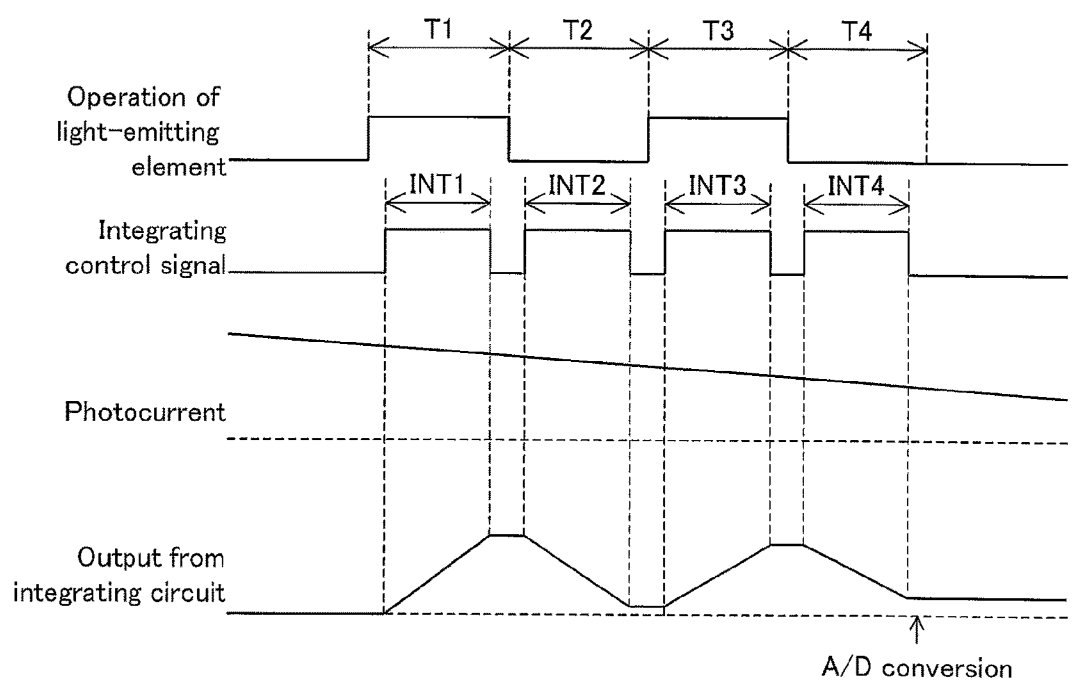
FIG. 16 is a timing chart showing a form of integration in accordance with a comparative example of the form of integration of photocurrent values of FIG. 15.

FIG. 16 is a timing chart showing a form of integration in accordance with a comparative example of the form of integration of photocurrent values of FIG. 15. Unlike the form of integration of FIG. 15, a light-emitting element on period (T1), a light-emitting element off period (T2), a light-emitting element on period (T3), a light-emitting element off period (T4) are regarded as one cycle (see FIG. 16). Thus, under a condition in which disturbance light is subjected to a constant decrease, a positive output remaining by performing integration in a positive direction during the light-emitting element on period (T1) (INT1) and performing integration in a negative direction during the light-emitting element off period (T2) (INT2) remains in a final integrated value. Then, in a case where integration is performed in the positive direction during the light-emitting element on period (T3) (INT3) and integration is performed in the negative direction during the light-emitting element off period (T4) (INT4), also during the periods INT3 and INT4, positive outputs are produced while being superimposed on each other. This prevents disturbance light from being cancelled in one cycle of INT1 to INT4.

That is, in a case where disturbance light is subjected to a constant decrease, a disturbance light component, which is larger in the light-emitting element on period, causes an increase in photocurrent at all times. This produces an output that is supposed to be obtained in a case where there is a signal component attributed to a photocurrent caused by reflected light from an object to be sensed, though there is no such signal component.

In such a form of integration, no disturbance light is cancelled even in a case where a final integrated value is subjected to A/D conversion. This makes it impossible to obtain a digital value of a photocurrent in which a movement of an object to be sensed is accurately reflected.

Further, in the form of integration of FIG. 16, it is also impossible to cancel disturbance light that is subjected to a constant increase.

Comparative Example 3

In a case where disturbance DC light such as sunlight is incident on an optical sensor, two periods are provided in a period during which a photocurrent caused by the disturbance DC light flows. The two periods are a first period (T1 to T2) and a second period (T3 to T4). In a case where an electric charge in accordance with a difference between (a) an electric charge equivalent to an input current during the first period and (b) an electric charge equivalent to an input current during the second period is charged by a capacitor by charging, by, for example, the capacitor C1 as shown in FIG. 10, an electric charge equivalent to a photocurrent flowing during the first period, and discharging, by the capacitor C1, an electric charge equivalent to a photocurrent flowing during the second period, and a difference between the electric charges equivalent to the photocurrents during the two periods is digitized and the digitized difference is produced in a form of an output, it is possible to eliminate, from the output, an output caused by disturbance DC light. An optical sensor thus configured is effective in a case where disturbance light has a constant intensity. However, in a case where disturbance light fluctuates, the optical sensor may erroneously sense a direction of movement of an object to be sensed.

Here, the following description discusses a comparative example that serves as a measure for such a fluctuation in disturbance light component as described above. FIG. 17 is a timing chart showing a form of integration in accordance with another comparative example of the form of integration of photocurrent values of FIG. 15. In the form of integration of FIG. 17, a light-emitting element is off during a first period T1, a second period T2, and a fourth period T4, whereas the light-emitting element is on during a third period T3. Then, a first integrated value difference (ADC1) and a second integrated value difference (ADC2) are outputted. The first integrated value difference (ADC1) is a difference between integrated values of photocurrents of the light-receiving element which photocurrents are generated in accordance with respective states of the light-receiving element during the first period T1 and the second period T2. The second integrated value difference (ADC2) is a difference between integrated values of photocurrents of the light-receiving element which photocurrents are generated in accordance with respective states of the light-receiving element during the third period T3 and the fourth period T4. Note here that disturbance light is cancelled with respect to a monotonous change (constant decrease, constant increase) in disturbance light by outputting the second integrated value difference when the first integrated value difference is zero, and outputting a difference between the second integrated value difference and the first integrated value difference when the first integrated value difference is not zero. The form of integration of FIG. 17 thus requires a complicated process.

Further, it is determined by a register control circuit (not illustrated) that an integrated value ADC1 is positive, the integrated value ADC1 and an integrated value ADC2 are read out from a register (not illustrated), the integrated value ADC1 is subtracted from the integrated value ADC2 by a subtracting circuit (not illustrated), and an increase in integrated value ADC2 is canceled out from the integrated value ADC1.

Figure 17:
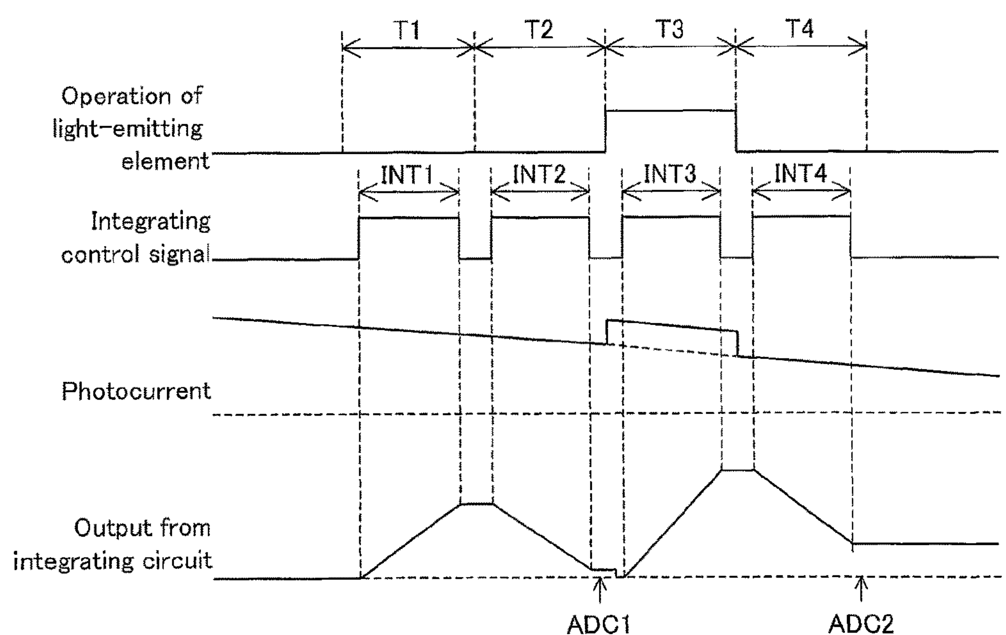
FIG. 17 is a timing chart showing a form of integration in accordance with another comparative example of the form of integration of photocurrent values of FIG. 15.

The form of integration of FIG. 17 thus requires determination of whether the integrated value ADC1 is positive or negative, and storage and readout of the two integrated values ADC1 and ADC2. Thus, as compared with the form of integration of FIG. 15, the form of integration of FIG. 17 is more complicated and further increases in necessary component (e.g., a register control circuit (not illustrated)).

Meanwhile, unlike the form of integration of FIG. 17, which form requires complicated signal calculation and a complicated configuration, the form of integration of FIG. 15 makes it possible to cancel even fluctuating disturbance light merely by changing a timing at which a light-emitting element is turned on/off (e.g., by causing the light-emitting element to be off, on, on, and off in this order).

Embodiment 5

A fifth embodiment of the present invention is described below with reference to FIG. 18. Note that for convenience, members having functions identical to those of the respective members described in Embodiments 1 through 4 are given respective identical reference numerals, and a description of those members is omitted here.

<Configuration, Operation, and Effect of Smartphone 201>

Figure 18:
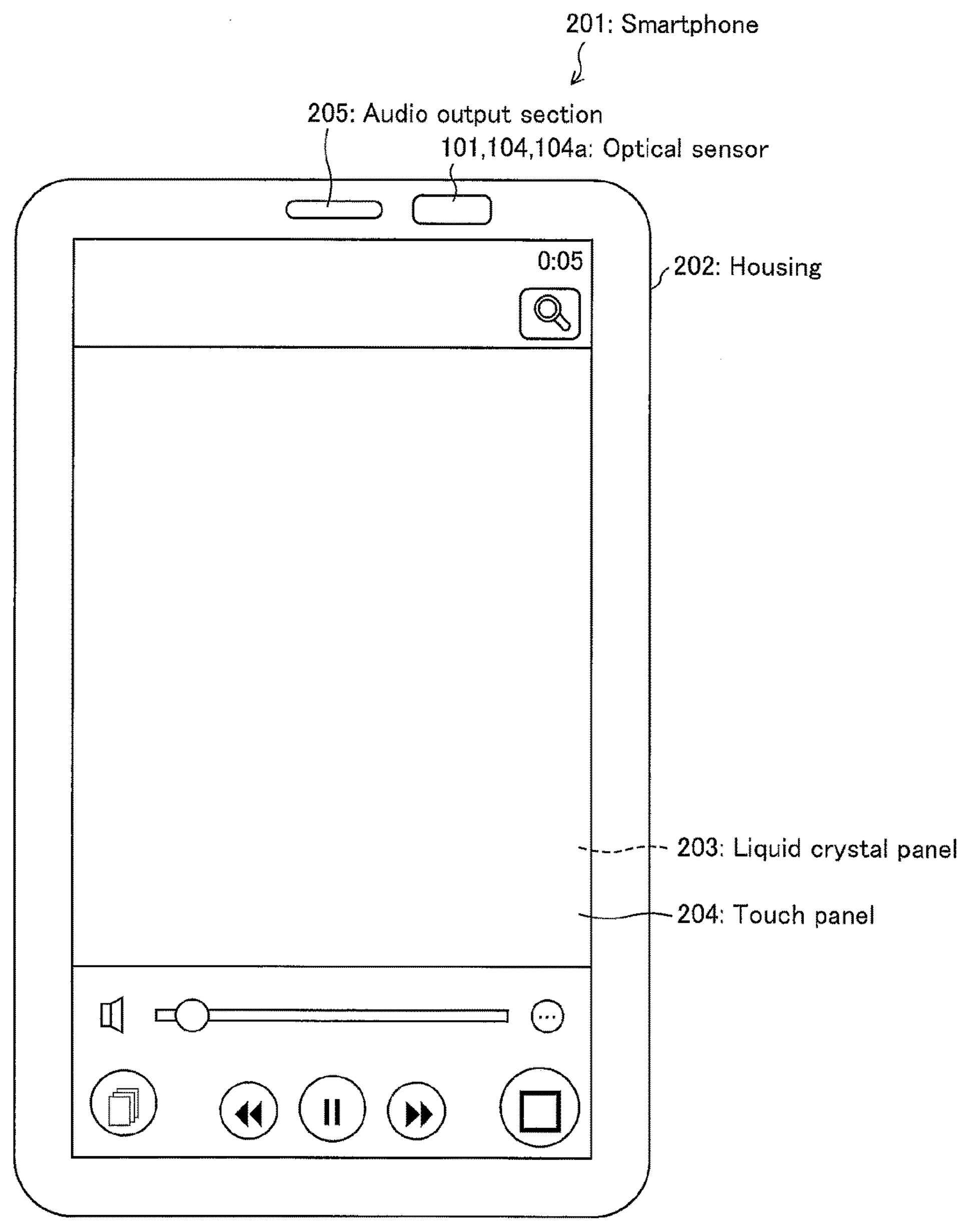
FIG. 18 schematically shows a configuration of a smartphone in accordance with a fifth embodiment of the present invention.

FIG. 18 schematically shows a configuration of a smartphone (electronic device) 201 according to Embodiment 5 of the present invention. As shown in FIG. 18, the smartphone 201 as an electronic device is constituted through the incorporation of a liquid crystal panel 203 and a touch panel 204 into a housing 202. In the smartphone 201, the liquid crystal panel 203 is provided on a side of the housing that faces in the same direction as an operation screen. Further, the touch panel 204 is provided on the liquid crystal panel 203.

Provided in a part of the housing 202 that is above the operation screen are an audio output section 205 and an optical sensor 101, 104, or 104*a*. The audio output section 205 is provided to output voices in a case where the smartphone 201 is used as a telephone and to output various types of sound according to operation of application programs.

The optical sensor 101, 104, or 104*a* is an optical sensor provided to sense the approach of an object to be sensed 100 (e.g. the face of a user) and to sense a gesture operation. That is, the smartphone 201 contains any one of the optical sensors 101, 104, and 104*a*.

By thus including any one of the optical sensors 101, 104, and 104*a*, the smartphone 201 can, even in an environment in which disturbance light is generated, accurately sense the position and/or movement of an object to be sensed 100 without being affected by the disturbance light.

Further, in a case where the optical sensor 101, 104, or 104*a* is applied to various electronic devices including not only a smartphone but also a digital camera and a car navigation system, it is possible to provide each of these electronic devices with a sensing function in which a direction of movement of an object to be sensed can be accurately sensed even in a case where disturbance light is present.

Embodiment 6

In Embodiment 4, integration is repeated in several cycles assuming that the light-emitting element off period, the light-emitting element on period, the light-emitting element on period, and the light-emitting element off period are regarded as one cycle, or the light-emitting element on period, the light-emitting element off period, the light-emitting element off period, and the light-emitting element on period are regarded as one cycle. That is, four periods are regarded as one cycle. Note, however, that a configuration of the present invention is not limited to a configuration in which four periods are regarded as one cycle.

Embodiment 6 discusses a configuration that is identical to but different from that of Embodiment 4 in that a timing of turning on and turning off of a light-emitting element is changed at an intermediate point of cyclic integration (between an nth period Tn and an n+1th period Tn+1) assuming that 2n consecutive periods are one cycle where n is an integer that is not less than two.

<Form of Integration of Photocurrent Value>

Figure 19:
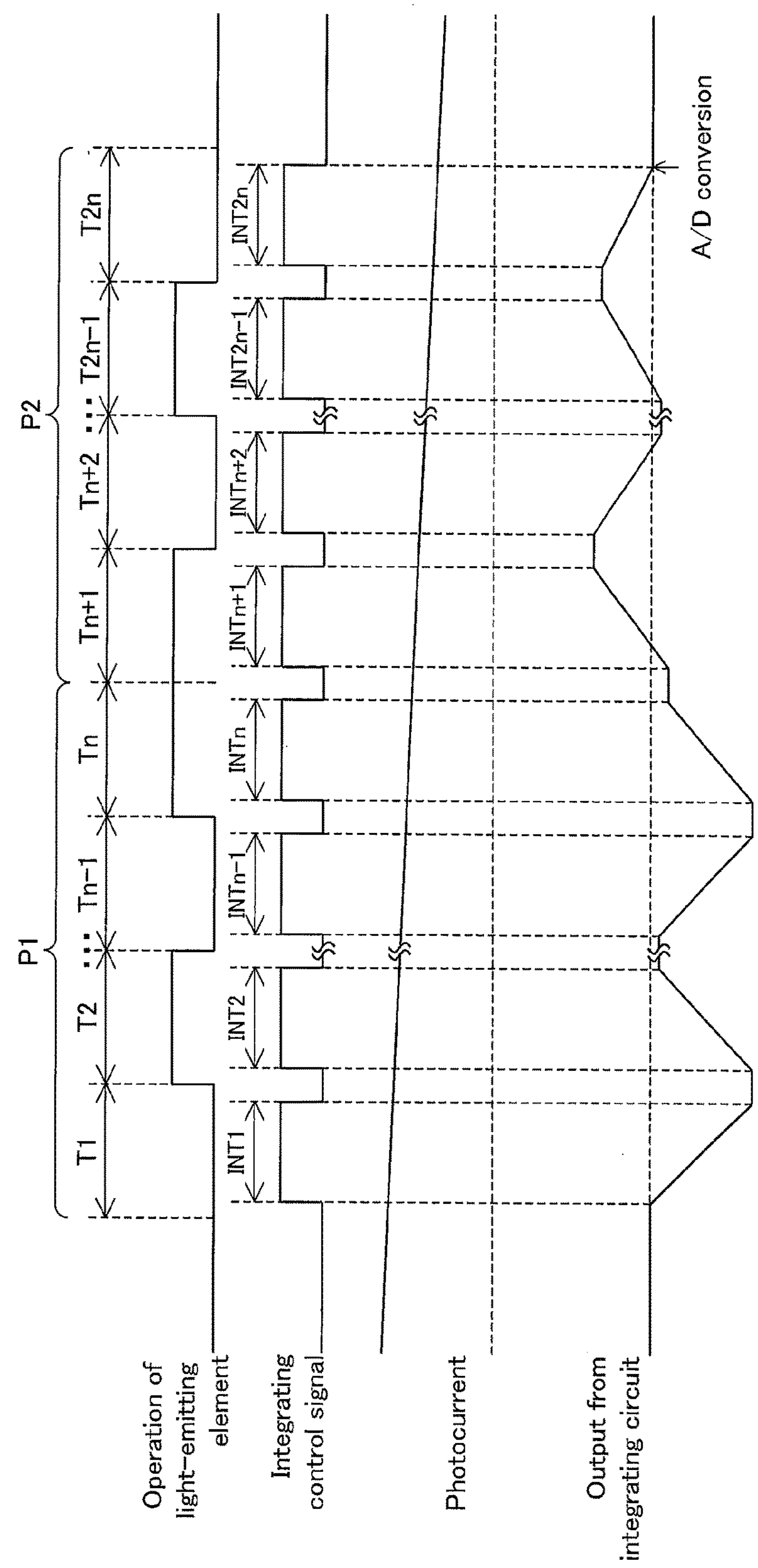
FIG. 19 is a timing chart showing a form of integration of photocurrent values in accordance with a sixth embodiment of the present invention.
Figure 20:
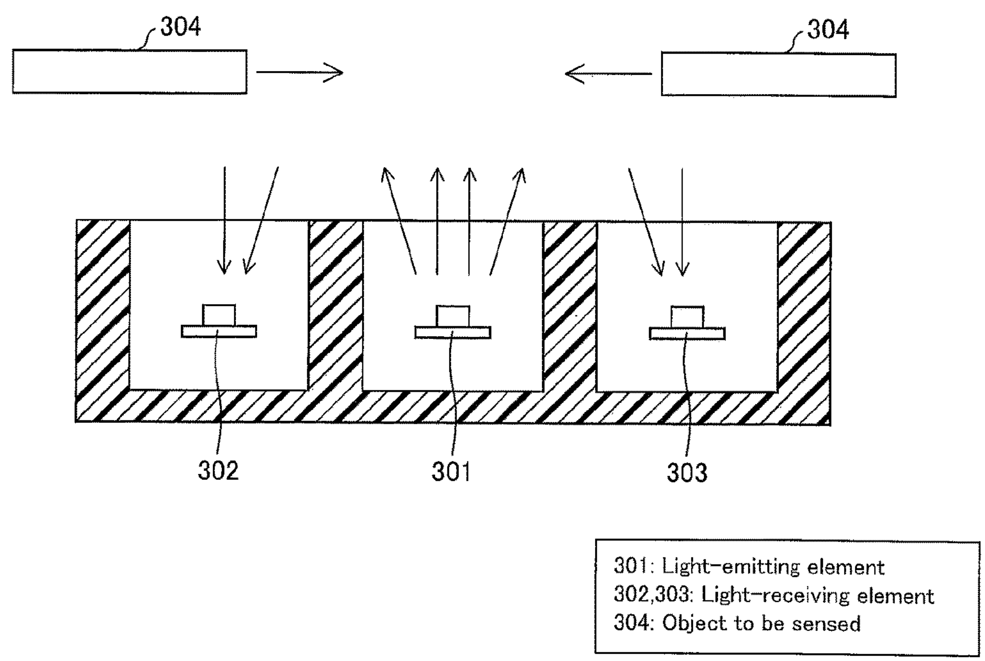
FIG. 20 is a longitudinal sectional view showing a cross-section configuration of an optical sensor in accordance with a conventional technique.

FIG. 19 is a timing chart showing a form of integration of photocurrent values in accordance with a sixth embodiment of the present invention. As shown in FIG. 19, a light-emitting element off period and a light-emitting element on period are alternately repeated to the intermediate point of cyclic integration (in a period group P1), and a light-emitting element on period and a light-emitting element off period are alternately repeated from the intermediate point of cyclic integration (in a period group P2). Note, however, that a configuration of the present invention is not limited to this. For example, the present invention may be configured such that a light-emitting element on period and a light-emitting element off period are alternately repeated to the intermediate point of cyclic integration, and a light-emitting element off period and a light-emitting element on period are alternately repeated from the intermediate point of cyclic integration. Note that a "period group" refers to a period including a plurality of light-emitting element on periods and/or a plurality of light-emitting element off periods.

Here, an integrating control signal defines 2n integral periods INT1, INT2 to INTn-1, INTn, INTn+1, INTn+2 to INT2*n*−1, and INT2*n* in which integration is performed, and also defines an integral cycle with the integral periods INT1 to INT2*n* as one cycle. The integral periods INT1 to INT2*n* are each a period during which a light-emitting element LED is on or off. The integral periods INT1 to INT2*n* are provided in a first period T1, a second period T2 to an n−1th period Tn−1, an nth period Tn, an n+1th period Tn+1, an n+2th period Tn+2 to a 2n−1th period T2*n*−1, and a 2nth period T2*n*, respectively.

That is, the optical sensor 104 shown in FIG. 9 or the optical sensor 104*a* shown in FIG. 14 may further include: a driving circuit (driving section) 8 that, in the 2n consecutive periods where n is an integer that is not less than two, (i) drives the light-emitting element LED so that the light-emitting element LED is turned off or on during the first period T1 and the light-emitting element LED is turned on or off during the n+1th period Tn+1, and (ii) drives the light-emitting element LED so that turning on and turning off of the light-emitting element are alternately repeated for each of the periods in each of the period group P1 including the first period T1 to the nth period Tn and the period group P2 including the n+1th period to the 2nth period; integrating circuits (integrating sections) 10 to 14 each of which integrates values of the photocurrents; and an integrating control circuit (integrating control section) 5 that controls the integrating circuits (integrating sections) 10 to 14 so that the integrating circuits (integrating sections) 10 to 14 each perform integration in a positive direction or a negative direction during a period in which the light-emitting element LED is on and the integrating circuits (integrating sections) 10 to 14 each perform integration in the negative direction or the positive direction during a period in which the light-emitting element LED is off.

According to the configuration, in a case where light (disturbance light) that is different from reflected light from an object to be sensed 100 reflecting light emitted by the light-emitting element LED and is incident from an outside of the optical sensor is subjected to a constant decrease or a constant increase in the 2n consecutive periods, the integrating control circuit 5 can control the integrating circuits 10 to 14 so that a value obtained by integration by the integrating circuits 10 to 14 of values of photocurrents caused by the disturbance light is 0. This allows the optical sensor 104 or the optical sensor 104*a* to eliminate, in sensing of a direction of movement of the object to be sensed 100, an adverse effect caused by disturbance light subjected to a constant decrease or a constant increase. That is, the optical sensor 104 or the optical sensor 104*a* can cancel disturbance light subjected to a constant decrease or a constant increase.

The 2n consecutive periods are configured such that a light-emitting element off period and a light-emitting element on period are repeated or a light-emitting element on period and a light-emitting element off period are repeated. This prevents a cycle of light-emitting element on and off periods from being longer. According to this, even in a situation in which disturbance light (noise) that changes at a high speed is incident on the optical sensor 104 or the optical sensor 104*a*, the optical sensor 104 or the optical sensor 104*a* can sense, in accordance with the change, a movement of the object to be sensed 100.

<Effect of Form of Integration of Photocurrent Value in Embodiment 6>

According to Embodiment 6, the optical sensor 104 or the optical sensor 104*a* can still more accurately sense a direction of movement of an object to be sensed even in a case where disturbance light subjected to a constant decrease or a constant increase is present.

[Software Implementation Example]

The optical sensor 101, 104, or 104*a*, the gesture circuit section 32, the illuminance circuit section 31, the light-receiving region switching circuit 50, the driving circuit 8, the integrating circuits 10 to 14, 1, and 1A, and the integrating control circuit 5 may be realized by a logic circuit (hardware) provided in an integrated circuit (IC chip) or the like or may be realized by software as executed by a CPU (Central Processing Unit).

In the latter case, the optical sensor 101, 104, or 104*a* includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a computer data signal embedded in a carrier wave which is embodied by electronic transmission.

CONCLUSION

An optical sensor (101, 104, 104*a*) of a first aspect of the present invention includes: a light-emitting element LED; a plurality of first light-receiving elements (a circularly-segmented light-receiving element group RDPD), circularly provided at edges of a region on which reflected light from an object to be sensed 100 reflecting light emitted by the light-emitting element is incident, for generating respective photocurrents upon receiving the reflected light; and a movement direction sensing section (gesture circuit section 32) for sensing a direction of movement of the object to be sensed upon receiving the photocurrents generated by the plurality of first light-receiving elements.

According to the configuration, the movement of the object to be sensed changes the region on which the reflected light from the object to be sensed reflecting light emitted by the light-emitting element is incident. The change starts in a case where the reflected light starts being incident at an edge of the region, and the change ends in a case where the reflected light finishes being incident at another edge of the region. That is, the reflected light that is incident on a part of the region which part is different from the edges does not reflect entry/departure by movement of the object to be sensed into/from a range of sensing by the optical sensor. Then, in a case where the plurality of first light-receiving elements are circularly provided at the edges of the region, the plurality of first light-receiving elements can receive the reflected light that accurately reflects entry/departure by movement of the object to be sensed into/from the range of sensing by the optical sensor. Thus, upon receiving the photocurrents generated by the plurality of first light-receiving elements, the movement direction sensing section can sense the direction of movement of the object to be sensed by comparing (a) a position of a first light-receiving element on which the reflected light is incident during entry by movement of the object to be sensed into the range of sensing by the optical sensor and (b) a position of another first light-receiving element on which the reflected light is incident during departure by movement of the object to be sensed from the range of sensing by the optical sensor. The optical sensor can thus sense the direction of movement of the object to be sensed.

Further, in a case where no first light-receiving element is provided in a region on which the reflected light that does not reflect entry/departure by movement of the object to be sensed into/from the range of sensing by the optical sensor is incident, it is possible in sensing of the direction of movement of the object to be sensed to prevent an adverse effect caused by light (disturbance light) that is different from the reflected light from the object to be sensed reflecting light emitted by the light-emitting element and is incident from an outside of the optical sensor.

Namely, the optical sensor can accurately sense the direction of movement of the object to be sensed even in a case where disturbance light is present.

In a second aspect of the present invention, the optical sensor of the first aspect may further include: a lens-shaped protrusion (light-receiving lens portion 92*b*) that has one of focal points which one is located in the region on which the reflected light is incident and that collects the reflected light in the region.

The configuration, which allows the lens-shaped protrusion to collect the reflected light from the object to be sensed, can more accurately sense the direction of movement of the object to be sensed even in a case where disturbance light is present.

In a third aspect of the present invention, the optical sensor of the first or second aspect may further include: a second light-receiving element (light-receiving element PDA3, PDB4, PDC1, PDD2) provided in a region inside a region in which the plurality of first light-receiving elements are circularly provided; and an illuminance detecting section (illuminance circuit section 31) for detecting an illuminance upon receiving a photocurrent generated by the second light-receiving element.

According to the configuration, the optical sensor can be used as, for example, an illuminance sensor, an RGB color sensor, or a proximity sensor by causing the second light-receiving element to receive light incident from the outside of the optical sensor and causing the illuminance detecting section to detect an illuminance.

Namely, the optical sensor can accurately sense the direction of movement of the object to be sensed even in a case where disturbance light is present, and the optical sensor can be used as, for example, an illuminance sensor, an RGB color sensor, or a proximity sensor.

In particular, in a case where the optical sensor includes the lens-shaped protrusion which has one of focal points which one is located in the region on which the reflected light from the object to be sensed is incident and that collects the reflected light in the region, it is possible to efficiently receive light incident from the outside of the optical sensor (an illuminance signal) by providing the lens-shaped protrusion so that the reflected light is collected by the second light-receiving element.

Namely, the optical sensor can accurately sense the direction of movement of the object to be sensed even in a case where disturbance light is present, and the optical sensor can be suitably used as, for example, an illuminance sensor, an RGB color sensor, or a proximity sensor.

In a fourth aspect of the present invention, the optical sensor of any one of the first through third aspects may further include a photocurrent selecting section (light-receiving region switching circuit 50) for selecting, from the photocurrents generated by the plurality of first light-receiving elements and in accordance with an intensity of disturbance light, a photocurrent to supply to the movement direction sensing section.

According to the configuration, the photocurrent selecting section selects a photocurrent to supply to the movement direction sensing section. This allows the movement direction sensing section to selectively use only a specific first light-receiving element. Note here that photocurrents caused by movement of the object to be sensed may be generated only by a part of the first light-receiving elements, depending on a positional relationship between the optical sensor and the object to be sensed. Thus, by selectively using only a first light-receiving element that generates a photocurrent caused by movement of the object to be sensed, the movement direction sensing section can prevent, in sensing of the direction of movement of the object to be sensed, an adverse effect caused by light (disturbance light) that is different from the reflected light from the object to be sensed reflecting light emitted by the light-emitting element LED and is incident from the outside of the optical sensor. That is, it is possible to increase S/N (Signal to Noise ratio) in sensing by the optical sensor of the direction of movement of the object to be sensed.

Namely, the optical sensor can further accurately sense the direction of movement of the object to be sensed.

Note here that a strength of a photocurrent generated by a first light-receiving element changes in accordance with an optical system that causes light to be incident on the first light-receiving element and/or a sensitivity or a size of the first light-receiving element. That is, "the photocurrent selecting section selects, from the photocurrents generated by the plurality of first light-receiving elements and in accordance with an intensity of disturbance light, a photocurrent to supply to the movement direction sensing section" can be paraphrased as "by using an optical system that causes light to be incident on the first light-receiving element, the photocurrent selecting section selects a photocurrent to supply to the movement direction sensing section", or "by using a sensitivity or a size of the first light-receiving element, the photocurrent selecting section selects a photocurrent to supply to the movement direction sensing section".

Examples of the adverse effect caused by disturbance light include a saturation phenomenon of an integrating circuit due to an excessive photocurrent. The photocurrents generated by the plurality of first light-receiving elements may be used by the integrating circuit for an operation to integrate values of the photocurrents. However, in a case where a value of a photocurrent exceeds a certain value and the photocurrent changes in excess of the certain value, the integrating circuit may perform an integrating operation assuming that the value of the photocurrent is maintained at the certain value. Such a phenomenon is referred to as a saturation phenomenon of an integrating circuit.

Even in a case where such an excessive photocurrent that causes a saturation phenomenon of an integrating circuit is generated by one or more first light-receiving elements, in order that saturation of an integrating circuit will not occur, the photocurrent selecting section can select, from the photocurrents generated by the first light-receiving elements, a photocurrent to supply to the movement direction sensing section. That is, "the photocurrent selecting section selects, from the photocurrents generated by the plurality of first light-receiving elements and in accordance with an intensity of disturbance light, a photocurrent to supply to the movement direction sensing section" can be paraphrased as "in order that saturation of an integrating circuit will not occur, the photocurrent selecting section selects a photocurrent to supply to the movement direction sensing section".

Further, assume that an integrating circuit is a capacitor. In this case, for example, an upper limit of a photocurrent at which upper limit the integrating circuit reaches saturation is specified in accordance with an amount of electric charge that the capacitor can accumulate, i.e., a capacitance value. Thus, "the photocurrent selecting section selects, from the photocurrents generated by the plurality of first light-receiving elements and in accordance with an intensity of disturbance light, a photocurrent to supply to the movement direction sensing section" can be paraphrased as "in accordance with a capacitance value of a capacitor, the photocurrent selecting section selects a photocurrent to supply to the movement direction sensing section".

In addition, assume that the optical sensor includes the illuminance detecting section for detecting an illuminance. In this case, when the illuminance exceeds a predetermined illuminance, the photocurrent selecting section limits the number of use of first light-receiving elements by selecting, from the photocurrents generated by the plurality of first light-receiving elements, a photocurrent to supply to the movement direction sensing section. This makes it possible to prevent an adverse effect caused by disturbance light. That is, "the photocurrent selecting section selects, from the photocurrents generated by the plurality of first light-receiving elements and in accordance with an intensity of disturbance light, a photocurrent to supply to the movement direction sensing section" can be paraphrased as "when an illuminance detected by the illuminance detecting section exceeds a predetermined value, the photocurrent selecting section selects a photocurrent to supply to the movement direction sensing section".

The optical sensor may further include a register that retains information on the plurality of first light-receiving elements each generating a photocurrent selected by the photocurrent selecting section. According to the configuration, the photocurrent selecting section can select a photocurrent at a high speed with reference to the register even in a case where the positional relationship between the optical sensor and the object to be sensed changes. This allows only a first light-receiving element that generates a photocurrent caused by movement of the object to be sensed to be selectively and accurately used in accordance with the change.

Namely, the optical sensor can accurately sense the direction of movement of the object to be sensed in accordance with the change in positional relationship between the optical sensor and the object to be sensed.

In a fifth aspect of the present invention, the optical sensor of any one of the first through fourth aspects may further include: a driving section (driving circuit 8) for driving the light-emitting element in a first period, a second period, a third period, and a fourth period, which are consecutive, so that the light-emitting element is turned on or off during the first period and the fourth period and the light-emitting element is turned off or on during the second period and the third period; an integrating section (integrating circuits 10 to 14, integrating circuit 1, integrating circuit 1A, capacitor C1) for integrating values of the photocurrents; and an integrating control section (integrating control circuit 5, charge and discharge control section 40) for controlling the integrating section so that the integrating section performs integration in a positive direction or a negative direction during a period in which the light-emitting element is on and the integrating section performs integration in the negative direction or the positive direction during a period in which the light-emitting element is off.

According to the configuration, in a case where light (disturbance light) that is different from the reflected light from the object to be sensed reflecting light emitted by the light-emitting element and is incident from the outside of the optical sensor is subjected to a constant decrease or a constant increase in the first period, the second period, the third period, and the fourth period, which are consecutive, the integrating control section can control the integrating section so that a value obtained by integration by the integrating section of values of photocurrents caused by the disturbance light is 0. This allows the optical sensor to eliminate, in sensing of the direction of movement of the object to be sensed, an adverse effect caused by disturbance light subjected to a constant decrease or a constant increase. That is, the optical sensor can cancel disturbance light subjected to a constant decrease or a constant increase.

Namely, the optical sensor can still more accurately sense a direction of movement of an object to be sensed even in a case where disturbance light subjected to a constant decrease or a constant increase is present.

In a sixth aspect of the present invention, the optical sensor of any one of the first through fourth aspects may further include: a driving section (driving circuit 8) for, in 2n consecutive periods where n is an integer that is not less than two, (i) driving the light-emitting element so that the light-emitting element is turned off or on during a first period and the light-emitting element is turned on or off during an n+1th period, and (ii) driving the light-emitting element so that turning on and turning off of the light-emitting element are alternately repeated for each of the periods in each of a period group P1 including the first period to an nth period and a period group P2 including the n+1th period to a 2nth period; an integrating section (integrating circuits 10 to 14, integrating circuit 1, integrating circuit 1A, capacitor C1) for integrating values of the photocurrents; and an integrating control section (integrating control circuit 5, charge and discharge control section 40) for controlling the integrating section so that the integrating section performs integration in a positive direction or a negative direction during a period in which the light-emitting element is on and the integrating section performs integration in the negative direction or the positive direction during a period in which the light-emitting element is off.

According to the configuration, in a case where light (disturbance light) that is different from the reflected light from the object to be sensed reflecting light emitted by the light-emitting element and is incident from the outside of the optical sensor is subjected to a constant decrease or a constant increase in the 2n consecutive periods, the integrating control section can control the integrating section so that a value obtained by integration by the integrating section of values of photocurrents caused by the disturbance light is 0. This allows the optical sensor to eliminate, in sensing of the direction of movement of the object to be sensed, an adverse effect caused by disturbance light subjected to a constant decrease or a constant increase. That is, the optical sensor can cancel disturbance light subjected to a constant decrease or a constant increase. Note that the "period group" refers to a period including a plurality of periods.

Namely, the optical sensor can still more accurately sense a direction of movement of an object to be sensed even in a case where disturbance light subjected to a constant decrease or a constant increase is present.

In a seventh aspect of the present invention, the optical sensor of the fifth or sixth aspect may be configured such that: the integrating section is the capacitor C1 charged and discharged by an electric charge equivalent to a strength of the photocurrent; and the charge and discharge control section 40 controls the charge and discharge of the capacitor by charging or discharging the capacitor during the period in which the light-emitting element is on, and discharging or charging the capacitor during the period in which the light-emitting element LED is off.

The configuration allows the integrating section to be simply configured to charge and discharge the capacitor by use of a photocurrent generated by a light-receiving element. That is, the configuration makes it possible to produce the optical sensor at low cost.

Namely, the optical sensor can still more accurately sense a direction of movement of an object to be sensed even in a case where disturbance light subjected to a constant decrease or a constant increase is present, and the optical sensor can be made low in cost.

In particular, in a case where the optical sensor includes the photocurrent selecting section described earlier, the movement direction sensing section can reduce (i) a photocurrent to be used and (ii) charge and discharge amounts of the capacitor by selectively using only a first light-receiving element by which a photocurrent caused by movement of the object to be sensed is generated. This makes it unnecessary for the optical sensor to use a large capacitor as an integrating section.

Namely, the optical sensor can still more accurately sense a direction of movement of the object to be sensed even in a case where disturbance light subjected to a constant decrease or a constant increase is present, and the optical sensor can be made lower in cost.

An electronic device (smartphone 201) of an eighth aspect of the present invention includes an optical sensor of any one of the first through seventh aspects.

According to the configuration, in a case where the optical sensor described earlier is applied to various electronic devices such as a smartphone, a digital camera, and a car navigation system, it is possible to provide each of these electronic devices with a sensing function in which a direction of movement of an object to be sensed can be accurately sensed even in a case where disturbance light is present.

The optical sensor according to the foregoing embodiments of the present invention may be realized by a computer. In this case, the present invention encompasses: a program for the optical sensor which program causes a computer to operate as the foregoing means of the optical sensor so that the optical sensor can be realized by the computer; and a computer-readable storage medium storing the program therein.

Additional Remarks

The present invention is not limited to the description of the embodiments above, but may be altered by a skilled person within the scope of the claims. An embodiment based on a proper combination of technical means disclosed in different embodiments is encompassed in the technical scope of the present invention. Furthermore, the technical means disclosed in different embodiments can be combined to form a new technical feature.

INDUSTRIAL APPLICABILITY

The present invention is usable for various electronic devices such as a smartphone, a digital camera, and a car navigation system each provided with an optical sensor such as an illuminance sensor, an RGB color sensor, or a proximity sensor, or a reflective optical sensor.

REFERENCE SIGNS LIST

1 Integrating circuit (integrating section)
1A Integrating circuit (integrating section)
5 Integrating control circuit (integrating control section)
8 Driving circuit (driving section)
10 to 14 Integrating circuit (integrating section)
31 Illuminance circuit section (illuminance detecting section)
32 Gesture circuit section (movement direction sensing section)
40 Charge and discharge control section (integrating control section)
50 Light-receiving region switching circuit (photocurrent selecting section)
92*b* Light-receiving lens portion (lens-shaped protrusion)
100 Object to be sensed
101 Optical sensor
104 Optical sensor
104*a* Optical sensor
201 Smartphone (electronic device)
C1 Capacitor (integrating section)
LED Light-emitting element
P1 Period group
P2 Period group
PD1 to PD4 Light-receiving element (first light-receiving element)
PD11 to PD13, PD21 to PD23, PD31 to PD33, and PD41 to PD43 Light-receiving elements (a plurality of first light-receiving elements)
PDA1, PDA2, PDA4, PDB1 to PDB3, PDC2 to PDC4, PDD1, PDD3, and PDD4 Light-receiving elements (a plurality of first light-receiving elements)
PDA3 Light-receiving element (second light-receiving element)
PDB4 Light-receiving element (second light-receiving element)
PDC1 Light-receiving element (second light-receiving element)
PDD2 Light-receiving element (second light-receiving element)
RDPD Circularly-segmented light-receiving element group (a plurality of first light-receiving elements)
RDPDa Circularly-segmented light-receiving element group (a plurality of first light-receiving elements)
RDPDb Circularly-segmented light-receiving element group (a plurality of first light-receiving elements)
T1 to T2*n* First period to 2nth period

The invention claimed is:

1. An optical sensor comprising:

a light-emitting element;

a circularly-segmented light-receiving element group, circularly provided at edges of a central region on which reflected light from an object to be sensed reflecting light emitted by the light-emitting element is incident, each of the elements in the circularly segmented light-receiving element group generating respective photocurrents upon receiving the reflected light; and a gesture circuit sensing a direction of movement of the object to be sensed upon receiving the photocurrents generated by the circularly-segmented light-receiving element group, the gesture circuit not utilizing any photocurrent from the central region to sense the direction of movement, the circularly-segmented light-receiving element group including a plurality of light-receiving elements circularly provided at edges of the central region on which the reflected light is incident, a movement of the object to be sensed changing a region on which the reflected light from the object to be sensed is incident, the changing region being defined by the reflected light being incident on the central region and changing to/from at least one of the light receiving elements of the circularly-segmented light-receiving group, the gesture circuit sensing a direction of movement by comparing positions of the light receiving elements in which the reflected light is incident during a) entry into and b) departure from a sensing range of the optical sensor.

2. The optical sensor as set forth in claim 1, further comprising:

a lens-shaped protrusion that has one of focal points which one is located in the region on which the reflected light is incident and that collects the reflected light in the region.

3. An electronic device comprising an optical sensor as set forth in claim 1.

4. An optical sensor comprising:

a light-emitting element;

a circularly-segmented light-receiving element group, circularly provided at outer edges of a central region on which reflected light from an object to be sensed reflecting light emitted by the light-emitting element is incident, each of the elements in the circularly segmented light-receiving element group generating respective photocurrents upon receiving the reflected light; and a gesture circuit sensing a direction of movement of the object to be sensed upon receiving the photocurrents generated by the circularly-segmented light-receiving element group, the gesture circuit not utilizing any photocurrent from the central region to sense the direction of movement, the circularly-segmented light-receiving element group including a plurality of light-receiving elements circularly provided at outer edges of the central region on which the reflected light is incident, a movement of the object to be sensed changing a region on which the reflected light from the object to be sensed is incident, the changing region being defined by the reflected light being incident on the central region and changing to/from at least one of the light receiving elements of the circularly-segmented light-receiving group, the gesture circuit sensing a direction of movement by comparing positions of the light receiving elements in which the reflected light is incident during a) entry into and b) departure from a sensing range of the optical sensor.

5. The optical sensor as set forth in claim 4, further comprising:

a lens-shaped protrusion that has one of focal points which one is located in the region on which the reflected light is incident and that collects the reflected light in the region.

6. An electronic device comprising an optical sensor as set forth in claim 4.

7. An optical sensor comprising:

a light-emitting element;

a circularly-segmented light-receiving element group, circularly provided at peripheries of a central region on which reflected light from an object to be sensed reflecting light emitted by the light-emitting element is incident, each of the elements in the circularly segmented light-receiving element group generating respective photocurrents upon receiving the reflected light; and a gesture circuit sensing a direction of movement of the object to be sensed upon receiving the photocurrents generated by the circularly-segmented light-receiving element group, the gesture circuit not utilizing any photocurrent from the central region to sense the direction of movement, the circularly-segmented light-receiving element group including a plurality of light-receiving elements circularly provided at peripheries of the central region on which the reflected light is incident, a movement of the object to be sensed changing a region on which the reflected light from the object to be sensed is incident, the changing region being defined by the reflected light being incident on the central region and changing to/from at least one of the light receiving elements of the circularly-segmented light-receiving group, the gesture circuit sensing a direction of movement by comparing positions of the light receiving elements in which the reflected light is incident during a) entry into and b) departure from a sensing range of the optical sensor.

8. The optical sensor as set forth in claim 7, further comprising:

a lens-shaped protrusion that has one of focal points which one is located in the region on which the reflected light is incident and that collects the reflected light in the region.

9. An electronic device comprising an optical sensor as set forth in claim 7.

10. An optical sensor comprising:

a light-emitting element;

a light blocking resin section for blocking a part of reflected light from an object to be sensed reflecting light emitted by the light-emitting element;

a circularly-segmented light-receiving element group, circularly provided at an adjacent section adjacent to a region on which the reflected light blocked by the light blocking resin section could be incident in a region on which the reflected light not blocked by the light blocking resin section is incident; and a gesture circuit sensing a direction of movement of the object to be sensed upon receiving the photocurrents generated by the circularly-segmented light-receiving element group, the circularly-segmented light-receiving element group including a plurality of light-receiving elements circularly provided at an adjacent section adjacent to a region on which the reflected light blocked by the light blocking resin section could be incident in the region on which the reflected light not blocked by the light blocking resin section is incident.

11. The optical sensor as set forth in claim 10, further comprising:

a lens-shaped protrusion that has one of focal points which one is located in the region on which the reflected light is incident and that collects the reflected light in the region.

12. An electronic device comprising an optical sensor as set forth in claim 10.

13. An optical sensor comprising:

a light-emitting element;

a plurality of first light-receiving elements, circularly provided at edges of a central region on which reflected light from an object to be sensed reflecting light emitted by the light-emitting element is incident, each of the elements in the circularly segmented light-receiving element group generating respective photocurrents upon receiving the reflected light;

a gesture circuit for sensing a direction of movement of the object to be sensed upon receiving the photocurrents generated by the plurality of first light-receiving elements;

the gesture circuit not utilizing any photocurrent from the central region to sense the direction of movement, a second light-receiving element, provided at a part surrounded by the edges of the region at which the plurality of first light-receiving elements are provided; and an illuminance circuit section for detecting illuminance upon receiving a photocurrent generated by the second light-receiving element, a movement of the object to be sensed changing a region on which the reflected light from the object to be sensed is incident, the changing region being defined by the reflected light being incident on the central region and changing to/from at least one of the light receiving elements of the circularly-segmented light-receiving group, the gesture circuit sensing a direction of movement by comparing positions of the light receiving elements in which the reflected light is incident during a) entry into and b) departure from a sensing range of the optical sensor.

14. The optical sensor as set forth in claim 13, further comprising:

a lens-shaped protrusion that has one of focal points which one is located in the region on which the reflected light is incident and that collects the reflected light in the region.

15. An electronic device comprising an optical sensor as set forth in claim 13.

16. An optical sensor comprising:

a light-emitting element;

a plurality of first light-receiving elements, circularly provided at edges of a region on which reflected light from an object to be sensed reflecting light emitted by the light-emitting element is incident, for generating respective photocurrents upon receiving the reflected light; and a gesture circuit sensing a direction of movement of the object to be sensed upon receiving the photocurrents generated by the plurality of first light-receiving elements, a driving circuit for driving the light-emitting element so that during a first period, a second period, a third period, and a fourth period, which are consecutive, the light-emitting element is turned on during the first period, then turned off during the second period, then turned off during the third period, and lastly turned on during the fourth period, or the light-emitting element is turned off during the first period, then turned on during the second period, then turned on during the third period, and lastly turned off during the fourth period;

an integrating circuit for integrating values of the photocurrents; and an integrating control circuit for controlling the integrating circuit so that during a period in which the light-emitting element is turned on, the integrating circuit performs integration in a positive direction or a negative direction, and during a period in which the light-emitting element is turned off, the integrating circuit performs integration in a negative direction or a positive direction.

17. The optical sensor as set forth in claim 16, further comprising:

a lens-shaped protrusion that has one of focal points which one is located in the region on which the reflected light is incident and that collects the reflected light in the region.

18. An electronic device comprising an optical sensor as set forth in claim 16.

19. An optical sensor comprising:

a light-emitting element;

a plurality of first light-receiving elements, circularly provided at edges of a region on which reflected light from an object to be sensed reflecting light emitted by the light-emitting element is incident, for generating respective photocurrents upon receiving the reflected light; and a gesture circuit sensing a direction of movement of the object to be sensed upon receiving the photocurrents generated by the plurality of first light-receiving elements, a driving circuit for, in 2n consecutive periods where n is an integer that is not less than two, (i) driving the light-emitting element so that the light-emitting element is turned off or on during a first period and the light-emitting element is turned on or off during an n+1 th period, and (ii) driving the light-emitting element so that turning on and turning off of the light-emitting element are alternately repeated for each of the periods in each of a period group including the first period to an nth period and a period group including the n+1th period to a 2nth period;

an integrating circuit for integrating values of the photocurrents; and an integrating control circuit for controlling the integrating circuit so that during a period in which the light-emitting element is turned on, the integrating circuit performs integration in a positive direction or a negative direction, and during a period in which the light-emitting element is turned off, the integrating circuit performs integration in a negative direction or a positive direction.

20. The optical sensor as set forth in claim 19, further comprising:

a lens-shaped protrusion that has one of focal points which one is located in the region on which the reflected light is incident and that collects the reflected light in the region.

21. An electronic device comprising an optical sensor as set forth in claim 19.

22. An optical sensor comprising:

a light-emitting element;

a plurality of first light-receiving elements, circularly provided at edges of a central region on which reflected light from an object to be sensed reflecting light emitted by the light-emitting element is incident, each of the elements in the circularly segmented light-receiving element group generating respective photocurrents upon receiving the reflected light; and a gesture circuit section for sensing a direction of movement of the object to be sensed upon receiving the photocurrents generated by the plurality of first light-receiving elements, the gesture circuit not utilizing any photocurrent from the central region to sense the direction of movement, and a light-receiving region switching circuit that selects, from the photocurrents generated by the plurality of first light-receiving elements and in accordance with an intensity of disturbance light, a photocurrent to supply to the gesture circuit section, a movement of the object to be sensed changing a region on which the reflected light from the object to be sensed is incident, the changing region being defined by the reflected light being incident on the central region and changing to/from at least one of the light receiving elements of the circularly-segmented light-receiving group, the gesture circuit sensing a direction of movement by comparing positions of the light receiving elements in which the reflected light is incident during a) entry into and b) departure from a sensing range of the optical sensor.

23. The optical sensor as set forth in claim 22, further comprising:

a lens-shaped protrusion that has one of focal points which one is located in the region on which the reflected light is incident and that collects the reflected light in the region.

24. An electronic device comprising an optical sensor as set forth in claim 22.

* * * * *